(12) United States Patent
Bowers

(10) Patent No.: US 8,012,349 B2
(45) Date of Patent: Sep. 6, 2011

(54) SMALL VOLUME UNITARY MOLDED FILTERS AND SUPPORTS FOR ADSORBENT BEDS

(75) Inventor: William F. Bowers, Topsfield, MA (US)

(73) Assignee: Orbital Biosciences, LLC, Topsfield, MA (US)

( * ) Notice: Subject to any disclaimer, the term of this patent is extended or adjusted under 35 U.S.C. 154(b) by 795 days.

(21) Appl. No.: 11/938,257

(22) Filed: Nov. 10, 2007

(65) Prior Publication Data

US 2008/0128346 A1     Jun. 5, 2008

Related U.S. Application Data

(60) Provisional application No. 60/866,494, filed on Nov. 20, 2006.

(51) Int. Cl.
*B01D 24/22* (2006.01)
(52) U.S. Cl. ............ 210/282; 210/291; 210/323.1; 210/455; 210/460; 210/490; 210/502.1; 422/535
(58) Field of Classification Search .......... 210/264, 210/282, 284, 291, 293, 323.1, 448, 455, 210/490, 495, 502.1, 460; 422/101, 535; 264/DIG. 48
See application file for complete search history.

(56) References Cited

U.S. PATENT DOCUMENTS

| | | | | |
|---|---|---|---|---|
| 3,451,777 | A | * | 6/1969 | Di Giulio ............... 436/500 |
| 3,869,392 | A | * | 3/1975 | Wolf ............... 210/493.1 |
| 4,039,652 | A | | 8/1977 | Adams et al. |
| 4,061,455 | A | | 12/1977 | von Holdt |
| 4,341,635 | A | | 7/1982 | Golias |
| 4,557,902 | A | * | 12/1985 | Mussmann ............... 422/59 |
| 4,601,820 | A | | 7/1986 | Leason |
| 4,664,800 | A | * | 5/1987 | Raines et al. ............... 210/445 |
| 4,708,932 | A | | 11/1987 | Axen et al. |
| 4,774,058 | A | | 9/1988 | Mehl |
| 4,775,635 | A | | 10/1988 | Ebersole et al. |

(Continued)

FOREIGN PATENT DOCUMENTS

DE     3717211     12/1988

(Continued)

OTHER PUBLICATIONS

Database WPI Week 200621, Thomson Scientific, London, GB; AN 2006-198982, XP002530455, and JP 2006 062120 A, Nippo Co. Ltd., Mar. 9, 2006 abstract.

(Continued)

*Primary Examiner* — Matthew O Savage
(74) *Attorney, Agent, or Firm* — Nutter McClennen & Fish LLP

(57) ABSTRACT

Methods and devices are provided for preparing and separating biological analytes. In one embodiment, one or more filtration devices or filter plate wells can be formed by clamping a filter sheet between first and second plates having at least one connecting cavity. First and second moveable core pins positioned on opposed sides of the sheet can be moved to remove portions of the sheet. A molten plastic can be injected to fill the volume between the cores and cavities and to form a liquid-impermeable sleeve wall or walls, each being separately sealed at the bottom to the perimeter of the sheet portion, each having liquid permeable regions of said removed and sealed sheet portion, and each remaining open at the top. Various exemplary configurations for filtration devices or filter plate wells are also disclosed.

11 Claims, 27 Drawing Sheets

U.S. PATENT DOCUMENTS

| | | | |
|---|---|---|---|
| 4,787,971 A | 11/1988 | Donald | |
| 4,797,260 A | 1/1989 | Parker | |
| 4,812,216 A | 3/1989 | Hurd et al. | |
| 4,900,441 A | 2/1990 | Graus et al. | |
| 4,902,481 A * | 2/1990 | Clark et al. | 422/101 |
| 4,948,442 A | 8/1990 | Manns | |
| 4,956,298 A | 9/1990 | Diekmann | |
| 4,965,933 A | 10/1990 | Mraz et al. | |
| 5,047,215 A | 9/1991 | Manns | |
| 5,108,704 A | 4/1992 | Bowers et al. | |
| 5,116,496 A * | 5/1992 | Scott | 210/232 |
| 5,336,412 A | 8/1994 | Huse et al. | |
| 5,395,521 A | 3/1995 | Jagadeeswaran | |
| 5,419,874 A | 5/1995 | Coassin et al. | |
| 5,429,742 A | 7/1995 | Gutman et al. | |
| 5,437,979 A | 8/1995 | Rampal et al. | |
| 5,441,645 A | 8/1995 | Sanford et al. | |
| 5,496,473 A | 3/1996 | Chow | |
| 5,589,063 A | 12/1996 | Sanford et al. | |
| 5,610,077 A | 3/1997 | Davis et al. | |
| 5,792,354 A * | 8/1998 | Aksberg | 210/406 |
| 5,833,927 A | 11/1998 | Raybuck et al. | |
| 5,861,125 A | 1/1999 | Shively | |
| 5,876,918 A | 3/1999 | Wainwright et al. | |
| 5,885,499 A | 3/1999 | Aksberg | |
| 5,922,200 A | 7/1999 | Pearl et al. | |
| 6,048,457 A | 4/2000 | Kopaciewicz et al. | |
| 6,103,195 A | 8/2000 | Shukla et al. | |
| 6,120,734 A | 9/2000 | Lackie | |
| 6,143,252 A | 11/2000 | Haxo, Jr. et al. | |
| 6,200,474 B1 | 3/2001 | Kopaciewicz et al. | |
| 6,375,699 B1 | 4/2002 | Beck | |
| 6,391,241 B1 | 5/2002 | Cote et al. | |
| 6,416,716 B1 | 7/2002 | Shukla et al. | |
| 6,426,230 B1 | 7/2002 | Feistel | |
| 6,427,731 B1 | 8/2002 | Horn | |
| 6,482,362 B1 | 11/2002 | Smith | |
| 6,503,438 B2 | 1/2003 | Beaumont et al. | |
| 6,550,349 B1 | 4/2003 | Godin | |
| 6,566,145 B2 | 5/2003 | Brewer | |
| 6,635,201 B1 | 10/2003 | Kopaciewicz et al. | |
| 6,653,201 B2 | 11/2003 | Chung | |
| 6,692,703 B2 | 2/2004 | Shoji et al. | |
| 6,761,855 B1 | 7/2004 | Cook et al. | |
| 6,770,246 B1 | 8/2004 | Husek | |
| 6,911,312 B2 | 6/2005 | Anderson et al. | |
| 2002/0094566 A1 | 7/2002 | Tubbs et al. | |
| 2002/0110495 A1 | 8/2002 | Hunt et al. | |
| 2002/0146840 A1 | 10/2002 | Hage et al. | |
| 2002/0164818 A1 | 11/2002 | Gruber et al. | |
| 2002/0182114 A1 | 12/2002 | Ingenhoven et al. | |
| 2003/0039589 A1 | 2/2003 | Smith | |
| 2003/0133843 A1 | 7/2003 | Hilhorst et al. | |
| 2003/0178370 A1 | 9/2003 | Fisk et al. | |
| 2003/0223912 A1 | 12/2003 | Knecht et al. | |
| 2004/0072375 A1 | 4/2004 | Gjerde et al. | |
| 2004/0122222 A1 | 6/2004 | Sakurai et al. | |
| 2004/0142488 A1 | 7/2004 | Gierde et al. | |
| 2005/0016921 A1 | 1/2005 | Gjerde et al. | |
| 2005/0019941 A1 | 1/2005 | Gjerde et al. | |
| 2005/0019950 A1 | 1/2005 | Gjerde et al. | |
| 2005/0019951 A1 | 1/2005 | Gjerde et al. | |
| 2005/0045543 A1 | 3/2005 | Gjerde et al. | |
| 2005/0255604 A1 | 11/2005 | Gjerde et al. | |
| 2005/0258097 A1 | 11/2005 | Gjerde et al. | |
| 2006/0019407 A1 | 1/2006 | Fulton et al. | |

FOREIGN PATENT DOCUMENTS

| | | |
|---|---|---|
| EP | 0448876 | 10/1991 |
| EP | 0588564 | 3/1994 |
| JP | 2006062120 A | 3/2006 |
| WO | 2004007081 | 1/2004 |

OTHER PUBLICATIONS

International Search Report, Application No. PCT/US2007/024175.

* cited by examiner

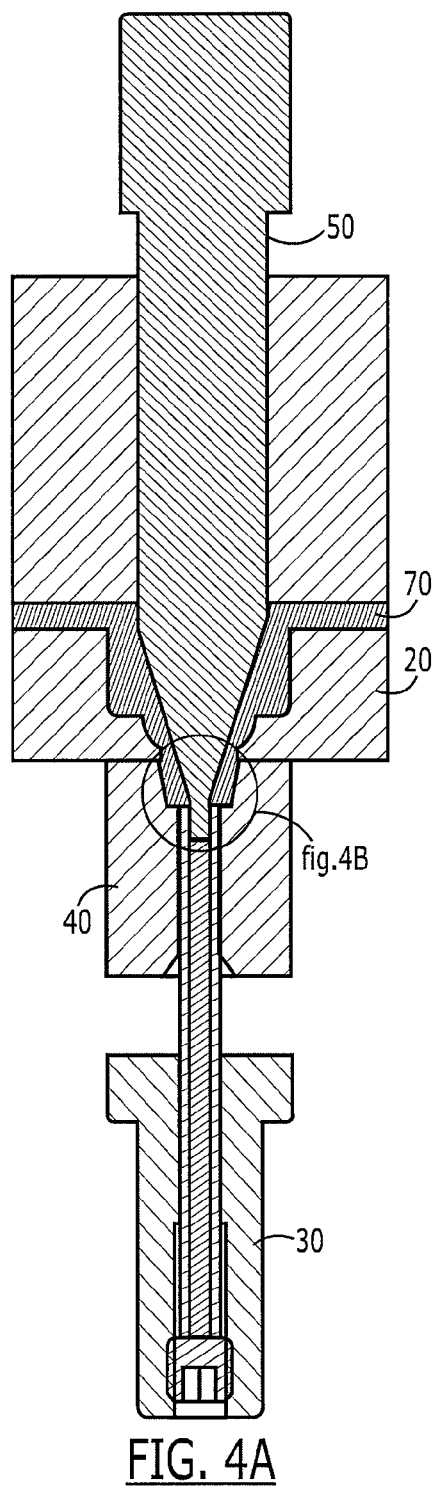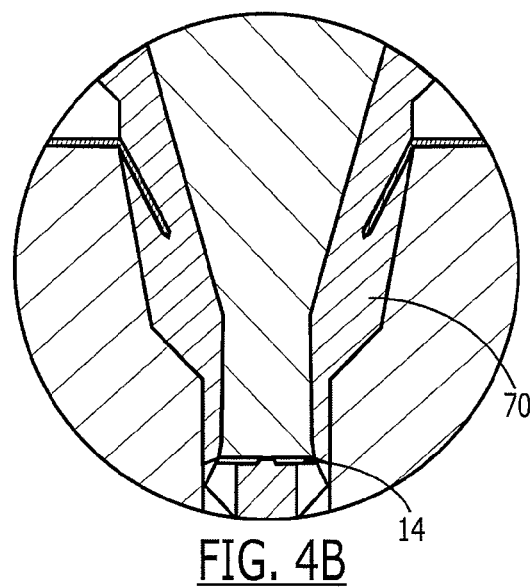
FIG. 4A
FIG. 4B

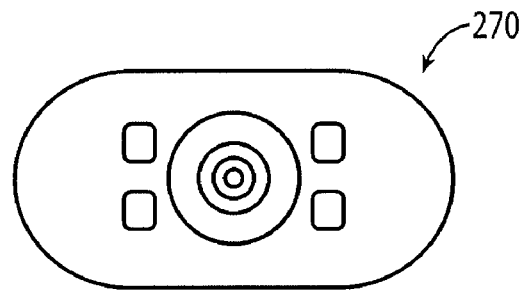
FIG. 7A
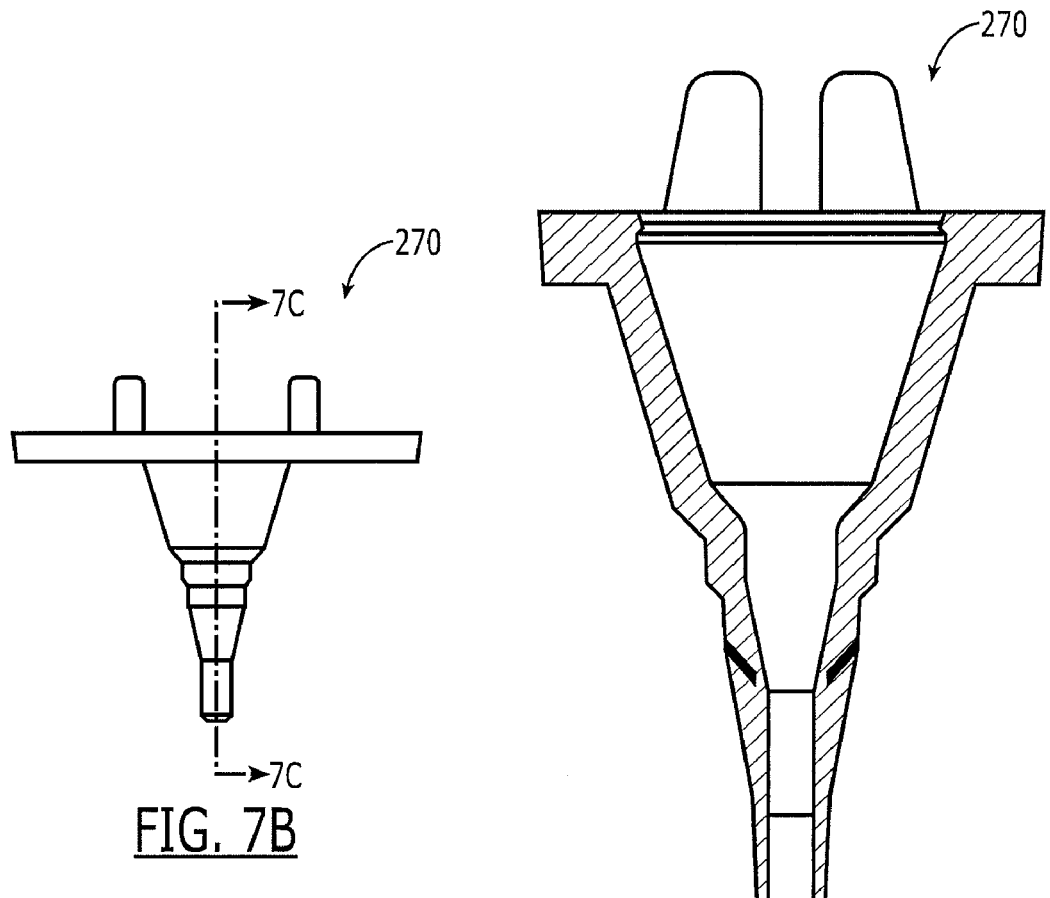
FIG. 7B
FIG. 7C

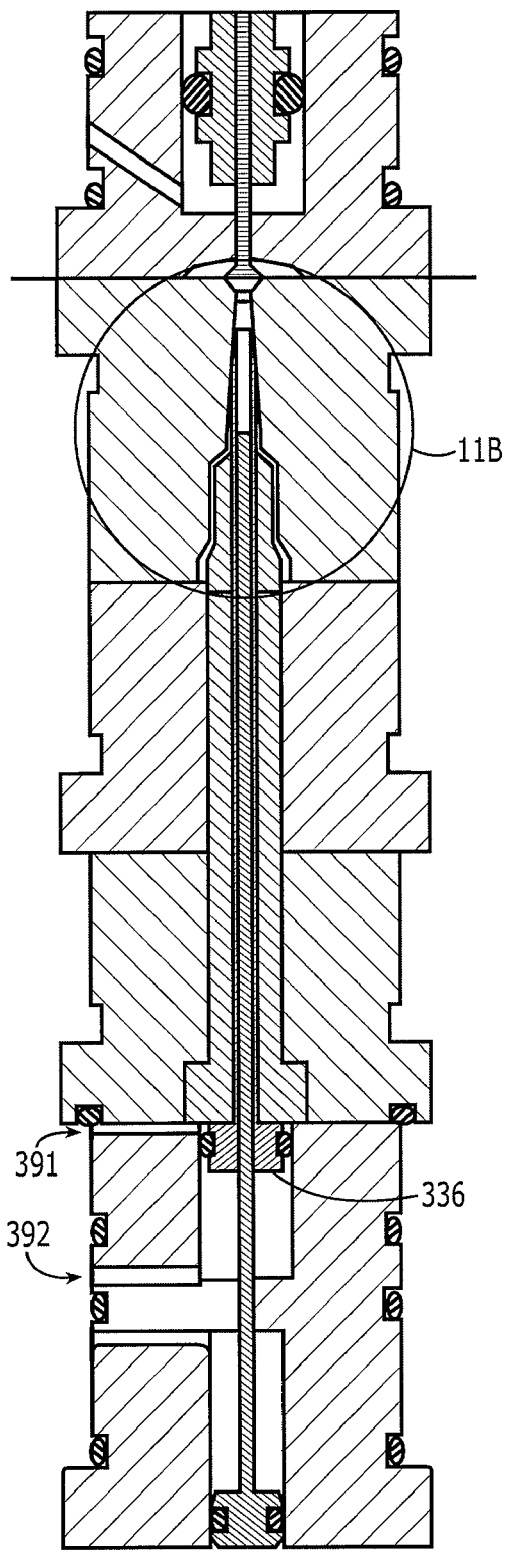
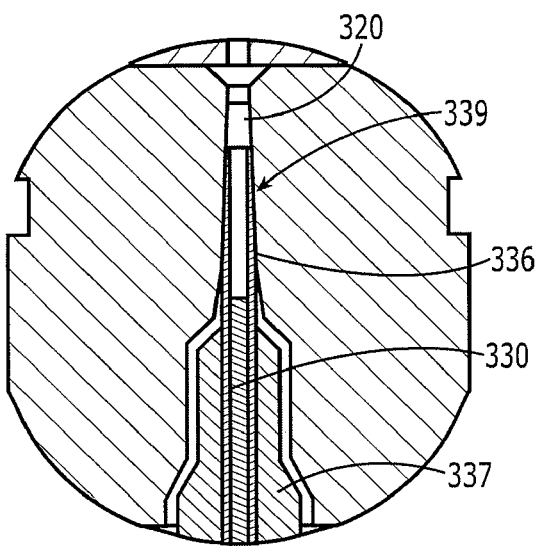
FIG. 11A
FIG. 11B

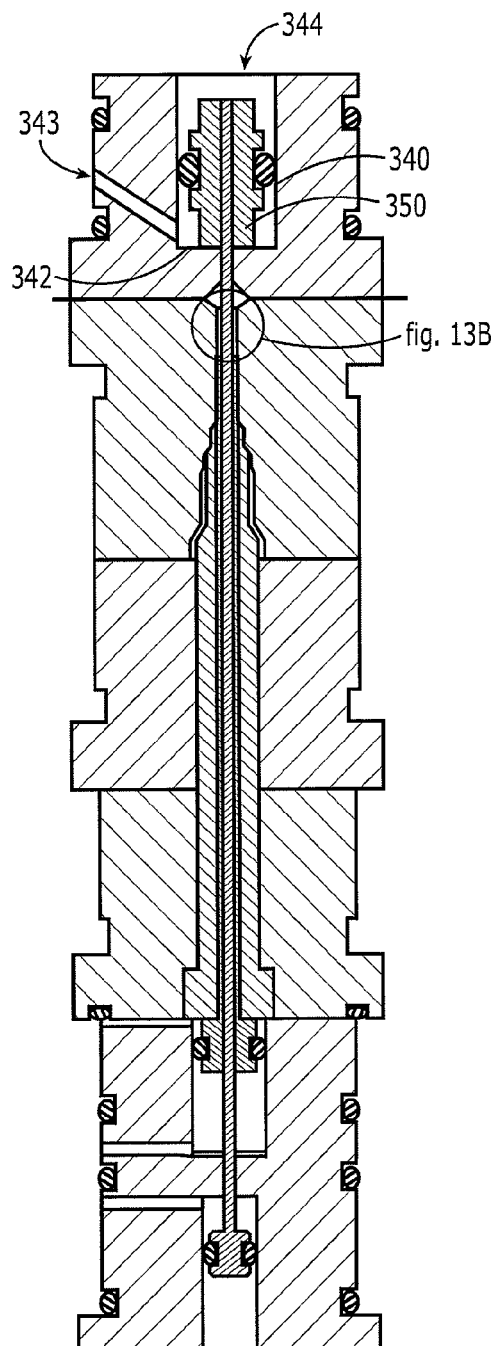
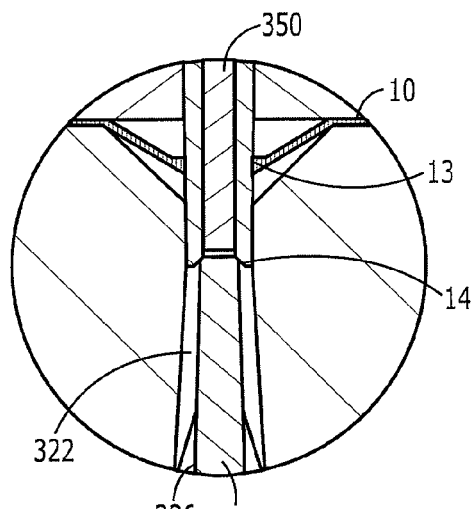
FIG. 13A
FIG. 13B

SMALL VOLUME UNITARY MOLDED FILTERS AND SUPPORTS FOR ADSORBENT BEDS

CROSS-REFERENCE TO RELATED APPLICATIONS

The applications claims priority to U.S. Provisional Application No. 60/866,494 filed on Nov. 20, 2006 and entitled "Small Volume Unitary Molded Filters And Supports For Adsorbent Beds," which is hereby incorporated by reference in its entirety.

STATEMENT REGARDING FEDERALLY-SPONSORED RESEARCH

The United States government has certain rights to this invention pursuant to Grant # 1 R43 RR018054-01 awarded by the U.S. National Institute of Health.

FIELD OF THE INVENTION

The present invention relates to filtration devices, and in particular to molded single and multiwell small volume filtration devices for preparing and separating biological analytes and to methods for manufacturing and using the same.

BACKGROUND OF THE INVENTION

With the recent completion of sequencing of the human genome and continuing development of more rapid and sensitive protein analytical methods requiring sample volumes of a few uL or less, such as mass spectrometry, surface plasmon resonance, x ray crystallography, Enzyme Linked Immuno Sorbent Assay (ELISA) and nuclear magnetic resonance, there is a growing need for more cost-effective tools for purification and analysis of very small amounts of proteins.

Microporous polymeric membranes and nonwoven polymeric and inorganic filtration media are widely used in biological research to capture particulates and cells or cell fragments from fluids. The filters may be selected or chemically modified to directly capture dissolved molecules by ionic, hydrophobic, hydrogen bonding, or affinity interactions with the filter itself. Neutral inert filters are commonly used to retain packed beds of porous or nonporous chromatographic beads having such interactions, and to retain beds of size-exclusion beads having pores of a size useful to separate macromolecules larger than the pores from molecules able to enter the pores.

Similar to reactive membranes, porous monoliths may be prepared which have porous (e.g. U.S. Pat. Nos. 6,048,457; 6,200,474; 6,653,201) or nonporous (e.g. U.S. Pat. App. No. 20,020,164,818) beads fused or liked together to form a self-supporting shaped article commonly contained in a conical pipette tip which thereby need not incorporate a support filter. This construction has the advantage of eliminating need for a bed supporting means, but adds the cost of multiple process steps on each device, and can introduce new sources of variability between devices resulting from the added operations, as compared to beds physically packed from beads which are all prepared as a uniform batch.

Fluids are commonly moved through such devices by application of controlled difference in either air or in hydrostatic fluid pressure. Single devices and arrays of 8 or 12 discrete devices are commonly formed in molded plastic pipette tips, permitting sequential filling by aspiration and emptying by extension of the pipettor piston to create air pressure in each tip device. Arrays of such devices are formed in multiwell filter plates having 96, 384 and larger numbers of wells each having a filter disc forming the bottom surface of the well. These plates are filled and handled by robotic pipettors and filtration is easily obtained using a vacuum manifold, which may contain a collection plate having mating wells to receive each filtrate.

Alternatively, single devices or filterplates are placed in collection tubes or multiwell plates, respectively, and spun in a centrifuge to generate hydrostatic pressure to cause filtration and percolation through a particulate bed.

A variety of methods are used to manufacture single and multiwell filters for these applications. Individual disks may be punched or die cut and deposited into the base of pre-molded sleeves (U.S. Pat. Nos. 4,774,058; 6,482,362 B1). This is a multi-step process and leaks may develop if the loose filters are dislodged in shipment or use.

Disks may be welded or bonded to cover the tips of pre-molded sleeves or be crush captured between mating upper and lower sleeve segments (U.S. Pat. Nos. 4,902,481 and 5,833,927; U.S. Pat. Apps. 20,040,072,375 and 20,040,142,488). This construction requires multiple parts and steps, and is difficult to practice to form beds having volumes of 10 uL or less and low dead volume.

Segments of a single sheet of filter may be sealed and isolated by the process of ultrasonic welding together of upper and lower trays having mating chambers and apertures. Prevention of cross contamination between wells requires having the mating chambers circumscribed by means to cut through the sheet around each chamber as part of the weld (U.S. Pat. Nos. 4,948,442 and 5,047,215). This process would not be practical to produce individual beds having volumes of 10 uL or less with low dead volume.

A lower plate or part may be molded, having at least one cavity to receive a punched disk and to deliver filtrate through an aperture, which is then captured and sealed by insert molding a second part forming a sample well or chamber above it which bonds to the disk and to the first part (U.S. Pat. No. 6,391,241). This process requires three separate operations.

Many other methods are known in the art for fabrication of devices containing filters by insert molding (e.g. U.S. Pat. Nos. 4,601,820; 4,812,216; 5,429,742; and 5,922,200). In each case a piece of membrane or filter is first pre-cut, one or more supporting members are optionally pre-molded, the precut filter and optional pre-molded support are inserted in a mold cavity, and a thermoplastic housing is thereby formed around the filter. This known method of insert molding imposes the requirement of a high precision punch and die set to cleanly cut difficult materials such as nonwoven polypropylenes, which tend to shred and resist punching. Even with a high precision die set, considerable care is needed to consistently place and seal a punched disk, which may be less than 0.03 inch in diameter, into a micro-volume insert mold chamber.

Accordingly, there remains a need for improved methods and devices for preparing and separating biological analytes.

SUMMARY OF THE INVENTION

The present invention generally provides various filtration devices and methods for manufacturing the same. In one embodiment, a method of insert molding a filtration device is provided and includes clamping a filter sheet between first and second plates, advancing at least one pin member relative to the first and second plates to remove a central portion of the filter sheet from a sheet selvage, and injecting a molten plastic into a cavity formed in at least one of the first and second plates. The cavity can be in communication with at least a perimeter of the central portion of the filter sheet such that the molten plastic forms a wall having the perimeter of the central portion of the filter sheet embedded therein.

In one embodiment, advancing the at least one pin member can be effective to tear the central portion away from the sheet selvage. In an exemplary embodiment, the central portion has a frayed perimeter that is embedded within the wall formed by the molten plastic. The wall can be, for example, a sleeve having an inner lumen extending therethrough, and wherein the central portion includes a liquid permeable region extending across the inner lumen.

In another embodiment, at least one pin member can be a first core pin movably disposed within the first plate, and a second core pin movably disposed within the second plate. At least one of the first and second core pins can include a relieved central portion configured to reduce crushing and maintain permeability of a portion of the central portion, and a raised perimeter portion configured to grasp and crush a perimeter of the central portion. Advancing at least one pin can include grasping the central portion between the first and second core pins and advancing the first and second core pins relative to the first and second plates. In an exemplary embodiment, advancing the first and second core pins is effective to tear the central portion away from the sheet selvage.

In another embodiment, advancing the first and second core pins is effective to punch the central portion away from the sheet selvage. The at least one pin member can be a single stepped punch pin, and advancing the at least one pin member include advancing the punch pin to punch the central portion against the edge of the opposing plate away from the sheet selvage and into contact with a wall of the cavity. The single stepped punch pin can include a relieved central portion and an axial bore hole connected to a vacuum source such that the single stepped punch pin is effective to grasp the punched central portion as it is being advanced, and wherein the vacuum source is effective to vent the cavity as molten plastic is being injected into the cavity.

In another embodiment, the first core pin can be a telescoping assembly of inner and outer sleeves and a central wire. The inner sleeve can have a conical tip that guides the central wire as it is extended to grasp and remove the central portion. In other aspects, the first core pin can be a single sleeve and an extendable core wire. In yet another embodiment, the first and second core pins can have mating male and female conical members which provide self-aligning concentricity for grasping the filter sheet therebetween. In another embodiment, an opening can be formed between the first and second core pins for allowing the molten plastic to penetrate into a perimeter of the central portion. In other aspects, the second core pin can have an interconnecting system of slots configured to form integral molded supporting members beneath the central portion.

In another embodiment, at least a portion of the sheet selvage can be embedded in the wall, and the method can further include removing a portion of the sheet selvage extending from an outer surface of the wall. At least a portion of the cavity can include a relieved outer portion configured to assist in clamping the filter sheet before removing the portion of the sheet selvage extending from the outer surface of the wall.

A unitary insert molded filtration device is also provided, and in one embodiment the device includes a fluid-impermeable thermoplastic body having at least one lumen extending therethrough, and at least one fluid-permeable filter disposed within the at least one lumen and having a perimeter embedded in a wall of the thermoplastic body such that the filter extends across the lumen for allowing fluid flow therethrough. In an exemplary embodiment, the at least one fluid-permeable filter is disposed at an open end of the at least one lumen. The device can also include a filter remnant embedded in the wall of the body, and/or a perimeter of the filter can be frayed. The device can further include a packed bed of adsorbent particles disposed within the lumen. In an exemplary embodiment, the adsorbent particles are porous and/or non-porous adsorbent particles. In other aspects, the device can include an array of lumens and an array of filters disposed within the array of lumens to form a multiwell filter plate. The device can also include at least one integrally molded support member extending across the lumen and configured to support the filter.

In yet another embodiment, a device for capturing, purifying, or modifying dissolved substances is provided and includes an insert molded thermoplastic lower sleeve having an inner lumen extending therethrough and a filter extending across the inner lumen with a perimeter embedded in a wall of the sleeve, and an insert molded thermoplastic upper sleeve having an inner lumen extending therethrough and a filter extending across the inner lumen with a perimeter embedded in a wall of the sleeve. The upper sleeve can be mated to the lower sleeve such that fluid can flow from the inner lumen of the upper sleeve to the inner lumen of the lower sleeve.

In one embodiment, each filter can include a frayed perimeter embedded in the wall of the sleeve. The filter in the lower sleeve can extend across a lower-most end of the inner lumen of the lower sleeve, and the filter in the upper sleeve can extend across a lower-most end of the inner lumen in the upper sleeve. In another embodiment, a lower tip of the upper sleeve can form an annular chisel edge which is swaged inward as it is mated to the lower sleeve. The device can also include a filter remnant embedded within the walls of the lower and upper sleeves. The filter remnant in the lower sleeve can be located upward of the filter in the lower sleeve, and the filter remnant in the upper sleeve can be located upward of the filter in the upper sleeve. The device can also include adsorbent particles disposed within the inner lumen of the lower sleeve between the filters in the upper and lower sleeves. In other aspects, the upper and lower sleeves can each include a plurality of inner lumens extending therethrough with each inner lumen having a filter extending there across with a perimeter embedded in a wall of the sleeve. The device can also include a mating element formed on a portion thereof and configured to suspend the device in an opening of a centrifuge tube to permit centrifugal transfer of fluids from the upper sleeve through the lower sleeve into the centrifuge tube.

BRIEF DESCRIPTION OF THE DRAWINGS

The invention will be more fully understood from the following detailed description taken in conjunction with the accompanying drawings, in which:

FIG. 4A is a cross-sectional view of the insert mold of FIG. 1A, showing thermoplastic having filled the entire cavity and having formed a seal to the edge of the torn segment;

FIG. 4B is an enlarged view of a portion of the insert mold of FIG. 4A;

FIG. 7A is a top view of another embodiment of a molded part having a chamber to receive adsorbent particles and means to mate to the part to the molded part of FIG. 5A;

FIG. 7B is a side view of the molded part of FIG. 7A;

FIG. 7C is a cross-sectional view of the molded part of FIG. 7B;

FIG. 11A is a cross-sectional view of the insert mold of FIG. 9A, showing the core sleeve telescoped to engage the cavity wall;

FIG. 11B is an enlarged view of a portion of the insert mold of FIG. 11A;

FIG. 13A is a cross-sectional view of the insert mold of FIG. 9A, showing the moveable core pin fully extended, having thereby torn a segment of filter, and separated the segment from the body of the sheet;

FIG. 13B is an enlarged view of a portion of the insert mold of FIG. 13A;

DETAILED DESCRIPTION OF THE INVENTION

Figures 1A, 1B:
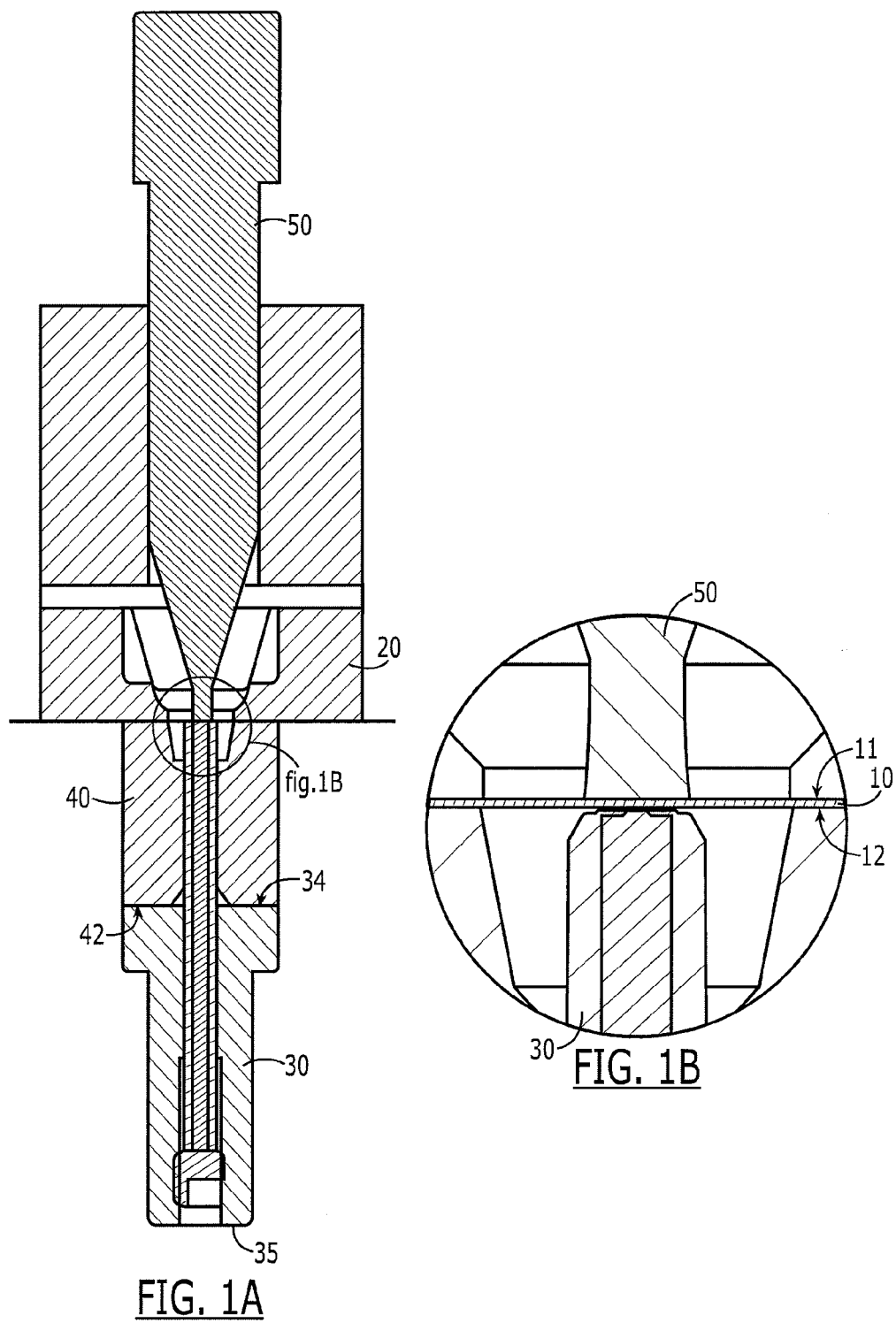
FIG. 1A is a cross-sectional view of one embodiment of an insert mold for forming a cup and upper bed support, showing a single cavity/core assembly closed upon a sheet of filter material.
FIG. 1B is an enlarged view of a portion of the insert mold of FIG. 1A.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present invention generally provides methods and devices for preparing and separating biological analytes. The methods and devices are particularly useful as they provide a single operation, lower cost method of manufacturing an array of single or multiwell filters using insert molding. In particular, practical means are provided for manufacturing exceedingly small filters and adsorbent beds having volumes of a few microliters or less, with the smallest possible dead volume, to permit highly precise adsorption, chemical modification, or purification, and subsequent elution of a desired analyte in the smallest possible volume. An easily-automated method of assembling filter devices is also provided which will avoid contamination by adhesives, solvents, or debris introduced by manual operations and multiple process steps.

It has been found that a sheet of suitable filter material may be clamped between upper and lower cavities of an insert mold, and that a core pin may be extended through the plane of the clamped filter in each cavity as the mold closes to first grasp the center portion of the filter in the cavity by means of a resilient mating core pin on the opposite side of the filter and then to punch, cut, or tear from the sheet disks which have edges projecting laterally into the cavities. In an exemplary embodiment, the disk is torn from the sheet to have ragged edges that project into the cavities. By moving the disk some distance away from the plane of the clamped sheet, it is possible to create an open channel along the ring in each cavity into which the injected thermoplastic readily flows. If the plane of the sealed filter is distal to the plane of the clamped sheet relative to the inlet gate, then the flow of molten plastic further deflects the remnants of the sheet left behind in the cavity, and thereby provides a fluid-impermeable wall at all heights including that of the sheet remnant.

Molten polymer encapsulation of the edges of the disk edge held between the core pins provides a robust seal by adhesion to the large area of the perimeter. If the sheet selvage plane transects the molded article, the unitary filters so formed are then removed from the sheet selvage either by simply withdrawing from the clamped cavities, or by first unclamping the cavities and die trimming the perimeter of each part prior to withdrawing the part from the cavity. In a preferred embodiment, the plane of the clamped sheet is external to the cavity forming the molded article, and the torn, cut, or punched disk is moved into the molding cavity prior to molding.

FIGS. 1A-6B illustrate one embodiment of an insert mold that is configured to form an upper support for a 5 uL volume adsorbent bed. In general, a sheet of nonwoven polymer 10 is shown for forming the support. By way of non-limiting example, suitable polymer nonwoven materials include polyolefins such as 6 mil thick Viledon® F02430D, 6 mil thick FO 2431D, and 4 mil thick FO 2432D drylaid polypropylene/polyethylene, available from Freudenberg Nonwovens Corp. Alternate, more wettable nonwoven supports include spunbonded polyesters such as Reemay® available from Filterweb Corp, and filter papers available from Whatman Corp. In addition to nonwoven polymer fiber filters and papers, supports may be made from homogeneous microporous membranes cast from polymers such as nylon, cellulose acetate, regenerated cellulose, polysulfone, polyethylene, polypropylene, polyether sulfone and its alloys with polyvinyl pyrrolidone, and polyvinylidene fluoride and its alloys and composites with more hydrophilic polymers, and the like, available from Pall Corp., Millipore Corp., Microdyn Nadir Corp., and Membrana Corp.

FIGS. 1A and 1B illustrate a single station assembly of a multi-station mold which has been clamped to secure a nonwoven sheet. While some of the supporting plates have been omitted for clarify, the single station assembly generally includes a first mold cavity 20 having a core pin 50 disposed therein, and a second mating cavity 40 having a core pin 30 disposed therein. The sheet or roll of nonwoven 10 is positioned so that its first side 11 contacts first mold cavity 20 and its second side 12 contacts second mold cavity 40. Resilient core pin 30 is held adjacent to the second side 12 of the sheet 10 by controlled air pressure means (not shown) applied to core pin face 35, causing contact of stop shoulder 34 with face 42 of the second mating cavity 40. Mating cavities 20 and 40 clamp sheet 10 securely in place in the plane of the sheet. Mating moveable core pin 50, which is shown partially retracted resting on sheet surface 11, may be positioned anywhere at this point so long as it does not extend proud of cavity 20.

Figures 2A, 2B:
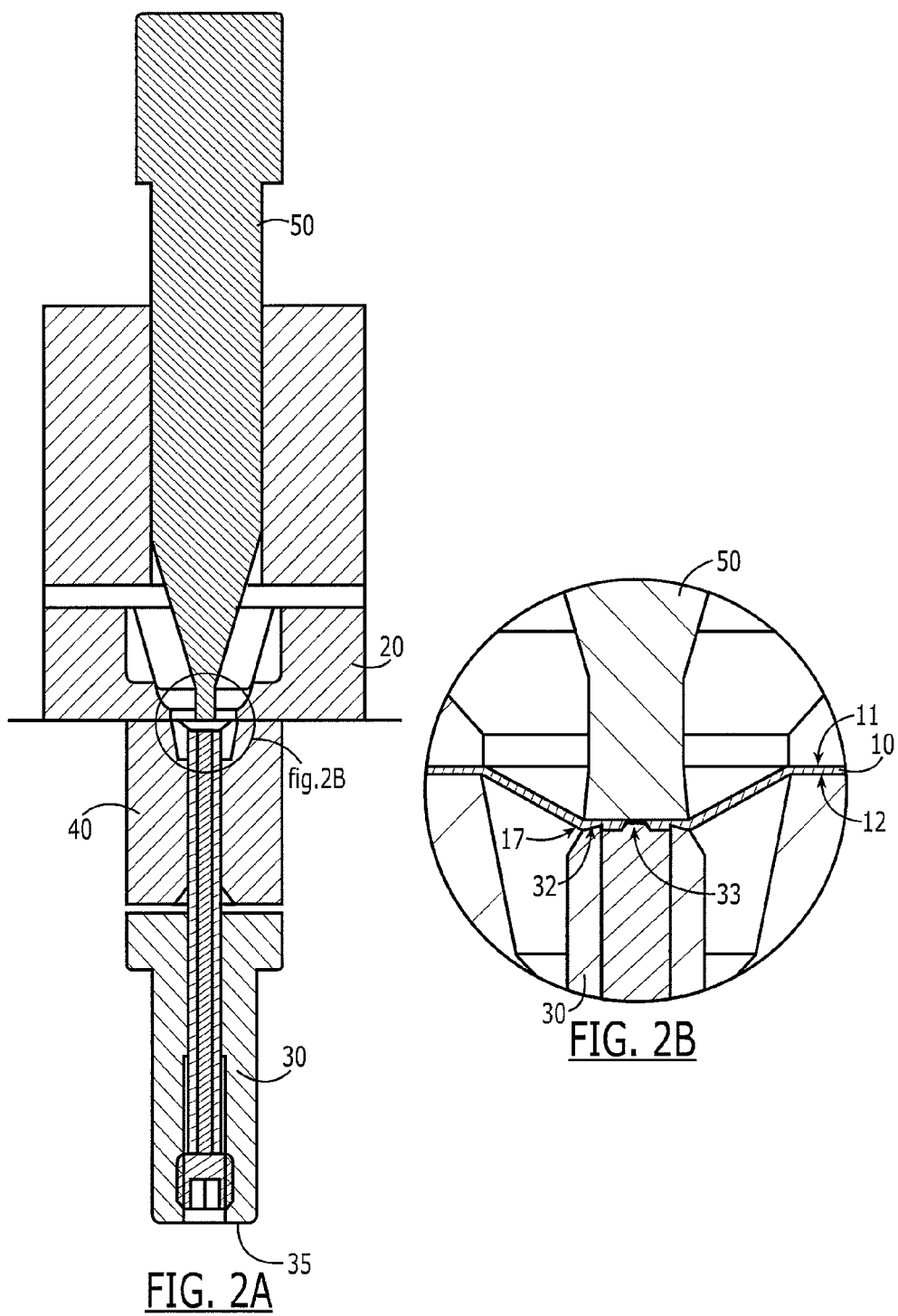
FIG. 2A is a cross-sectional view of the insert mold of FIG. 1A, showing the assembly shown clamped upon the sheet and beginning to tear a disk from the sheet.
FIG. 2B is an enlarged view of a portion of the insert mold of FIG. 2A.

FIGS. 2A and 2B show core pin 50 being advanced proud of cavity 20. As soon as core pin 50 moves beyond cavity 20, it compresses sheet 10 as the raised features 32 and 33 of core pin 30 are pushed into surface 12 of sheet 10 by the force of the controlled air pressure applied to core pin face 35. The compression of sheet 10 by core pin perimeter shoulder features 32 and center boss feature 33 provides a secure grasping action, causing the disk portion of sheet 10 between core pins 30 and 50 to be displaced along with core pins 30 and 50. This displacement creates localized stress and resulting strain 17 localized in sheet 10 just beyond the perimeter face of core pin 50.

Figures 3A, 3B:
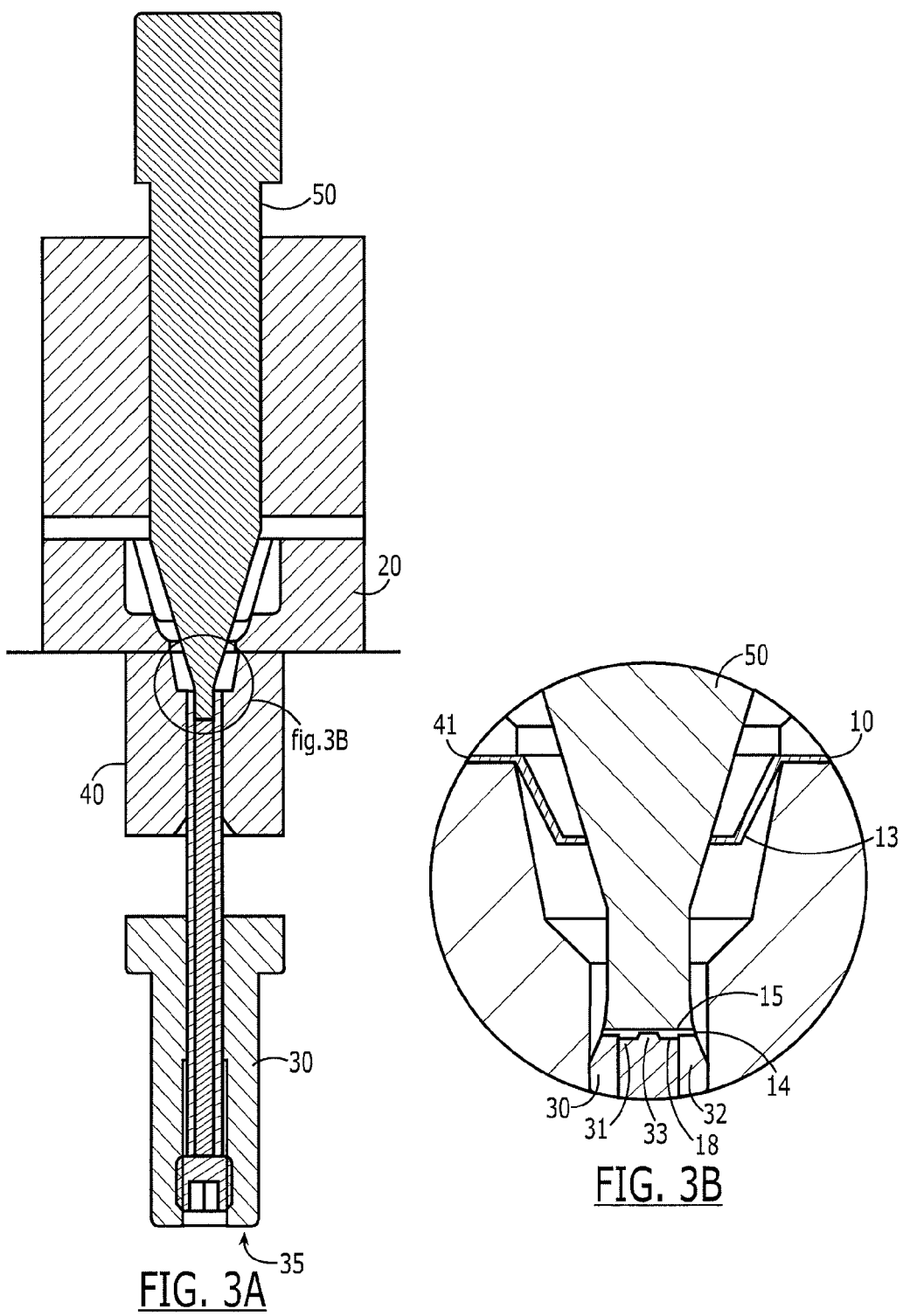
FIG. 3A is a cross-sectional view of the insert mold of FIG. 1A, showing a moveable core pin fully seated, having thereby torn a segment of filter and separated the segment from the body of the sheet.
FIG. 3B is an enlarged view of a portion of the insert mold of FIG. 3A.

FIGS. 3A and 3B show core pin 50 fully advanced to a stop (not shown). Torn disk edge 14 has been moved completely free of selvage remnant 13 which is seen depending from clamping plane 41 toward disk edge 14. A partially crushed portion of disk 14 is preferably formed at rim 15 by the shoulder portion 32 of core pin 30. Air pressure is preferably set so that sufficient grasping force at rim 15 and center boss 33 is applied to disk 14 to evenly tear it away from sheet 10 without slipping laterally, while the crushing force during tearing shown in FIG. 2B does not cut through disk 14 at rim position 15 or center boss 33. Air pressure acting on core pin face 35 must also provide sufficient force at rim 15 so that the pressure exerted in this region by core pin 30 is enough to prevent intrusion of molten polymer into the central portion of disk 14, and also enough to prevent the polymer injection pressure from further displacing core pin 30 and allowing flash to encapsulate disk 14 in the central region 31. Advantageously, annular region 18 of disk 14 remains uncompressed because of the relieved annular portion 31 of core pin 30 to preserve hydraulic permeability of this region of disk 14.

FIGS. 4A and 4B show molten thermoplastic 70 having been injected through a gate (not shown) to fully fill cavity 20 and also cavity 40. The passageway created by depending selvage remnant 13 (FIG. 3B) has permitted polymer to advance into cavity 40 all the way to disk 14. The frayed edge of disk 14 beneficially extends into injected molten polymer 70 to serve to anchor disk 14 in place in the resulting insert molded assembly.

Figure 5A:
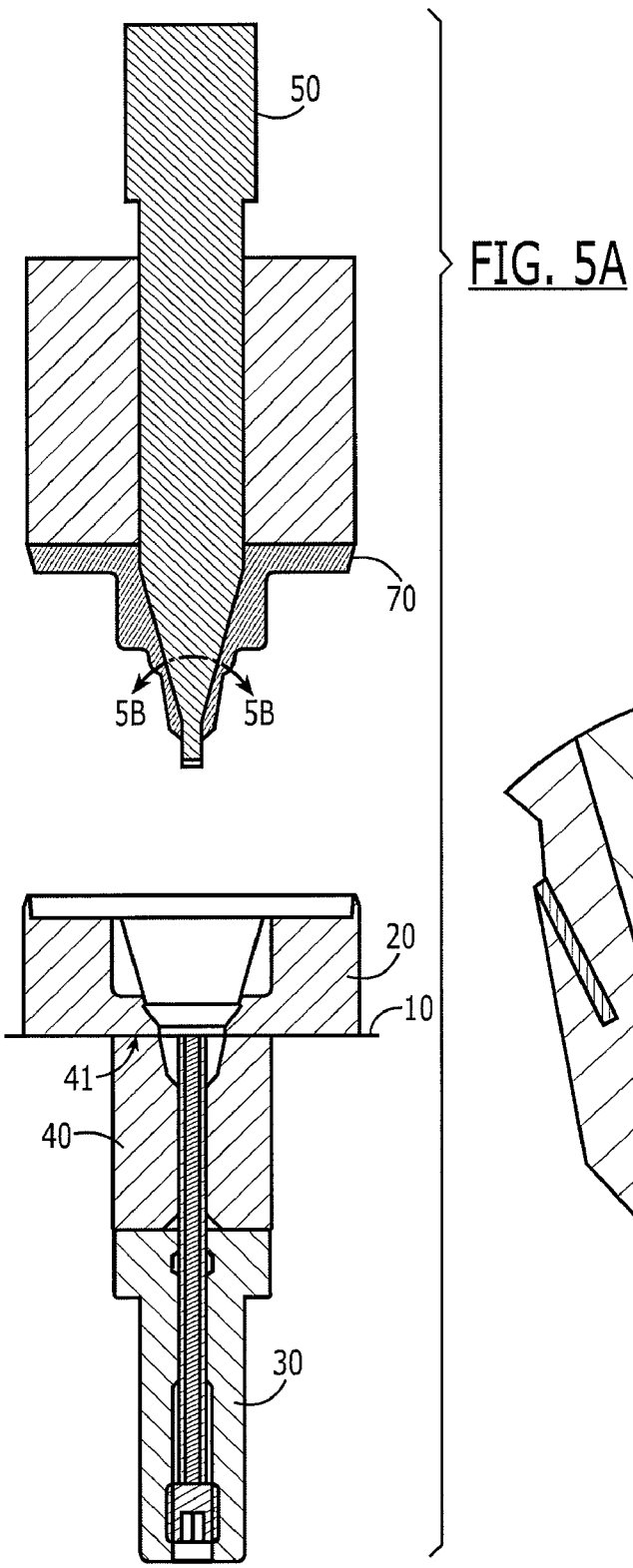
FIG. 5A is a cross-sectional view of the insert mold of FIG. 1A, showing the moveable core pin removed and the molded part tearing free from the sheet selvage.
Figure 5B:
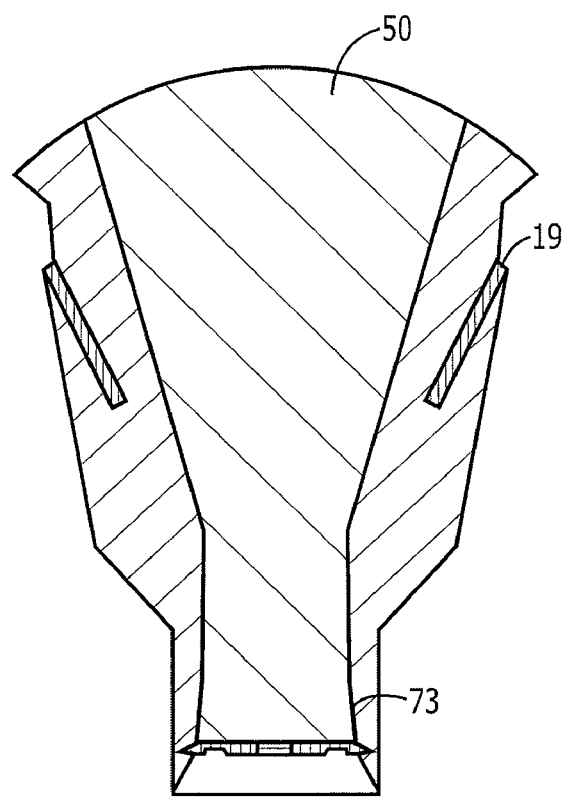
FIG. 5B is an enlarged view of a portion of the molded part and insert mold of FIG. 5A.

FIGS. 5A and 5B show core pin 50 being withdrawn with the cooled part 70 from the preferably still-clamped cavities 20 and 40 which thereby firmly grasp sheet 10 at clamping plane 41. Because core pin 50 has lip-forming taper 73, part 70 remains attached to core pin 50, which permits tearing part 70 free from sheet 10 at weakened point 19 in sheet 10. Air pressure brings core pin 30 back to the starting position as core pin 50 is withdrawn, or may be released while opening the mold to protect the sealed filter. If sheet 10 does not tear cleanly at weakened point 19, molded part 70 may be freed from sheet 10 by cutting or melting of sheet 10 at weakened point 19 with a die.

Figures 6A, 6B:
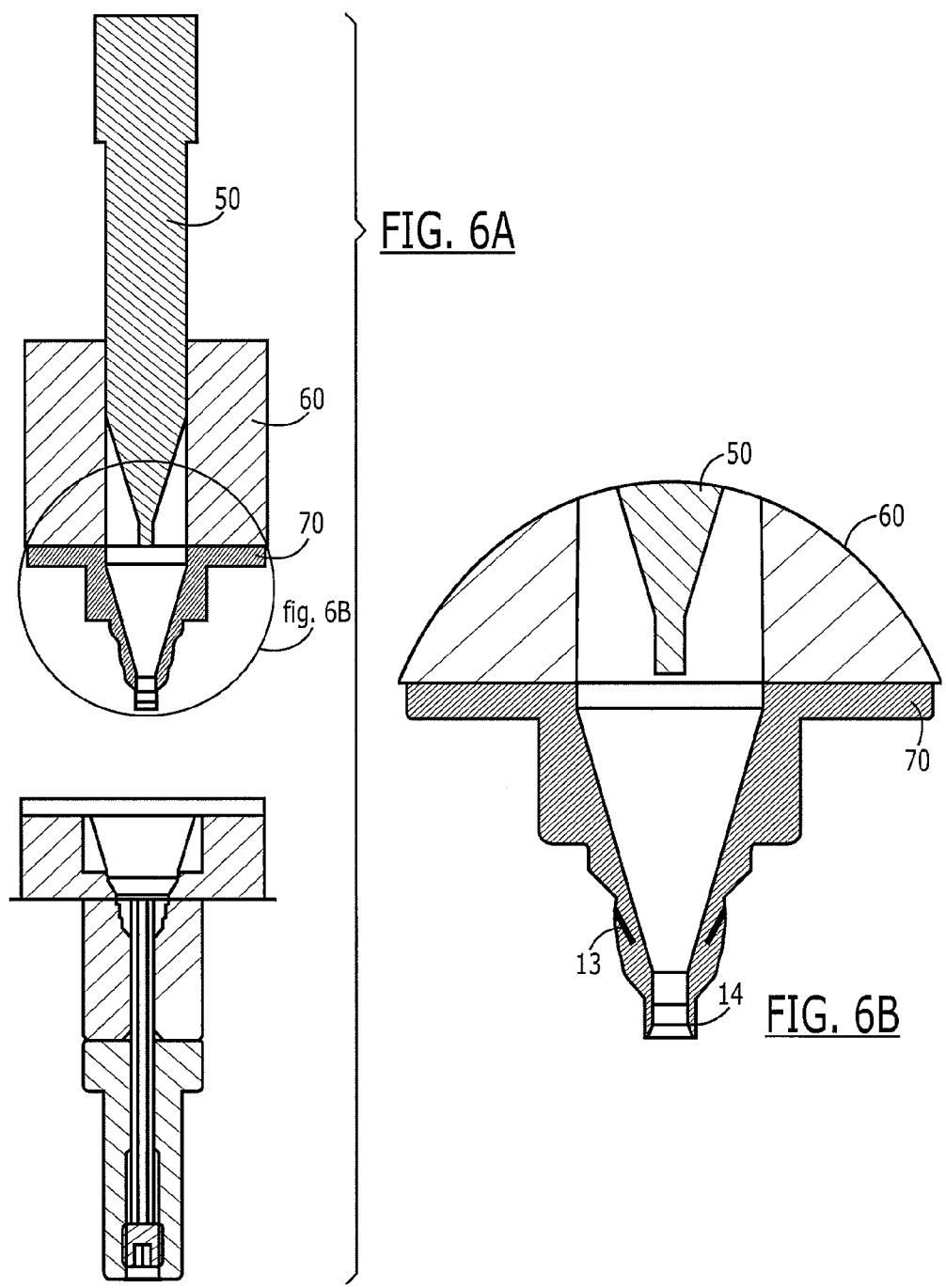
FIG. 6A is a cross-sectional view of the insert mold of FIG. 1A, showing the stripper plate removing the formed unitary filter from the moveable core pin.
FIG. 6B is an enlarged view of a portion of the insert mold of FIG. 6A.

FIGS. 6A and 6B show stripper means 60 being advanced so as to withdraw core pin 50 from its engagement with molded part 70, thereby freeing part 70 from the mold. FIG. 6B shows torn disk 14 encapsulated into molded part 70 at the torn edge of the disk 14, and the fluid tight seal formed by the integral inner wall of part 70 even at the position of embedded selvage remnant 13.

Figure 8:
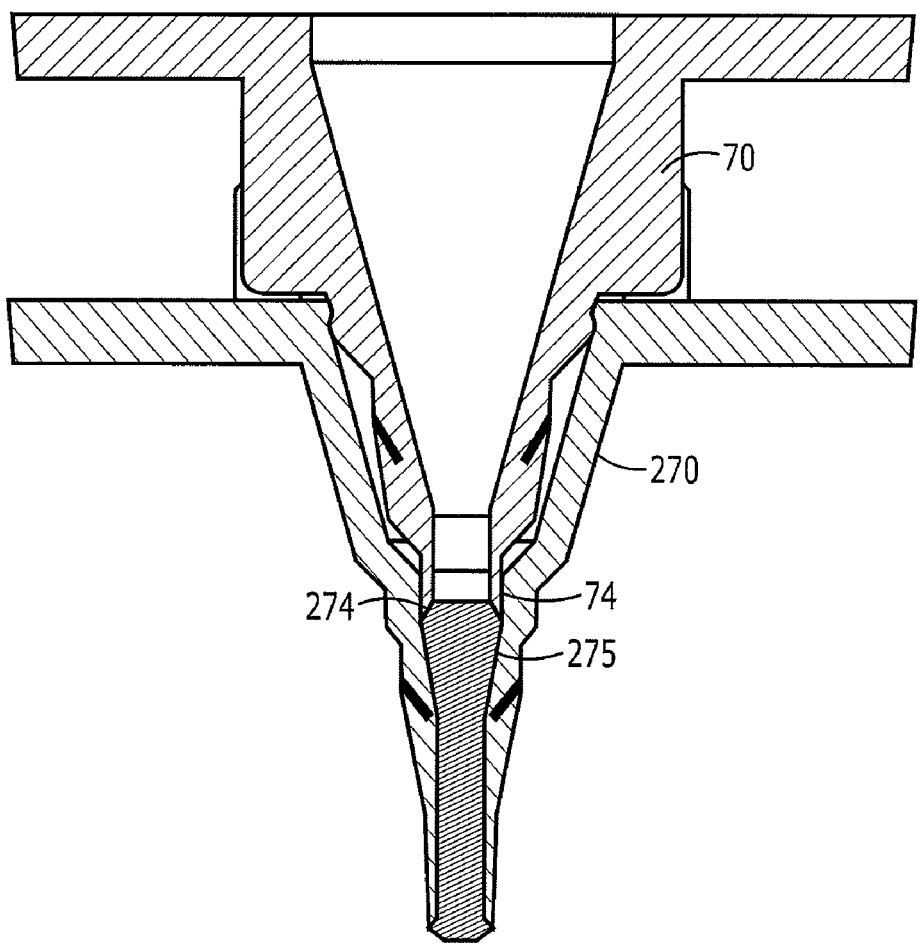
FIG. 8 is a cross-sectional view of the molded parts of FIGS. 5A and 7A mated together, showing a sealed microcolumn which is formed by packing adsorbent particles in the second part and securing them by pressing the first part down into a mating well of the second part.

FIGS. 7A-7C show one embodiment of lower part 270 which is designed to mate with molded upper part 70 to form a sealed 5 uL volume adsorbent bed, as shown in FIG. 8. The lower part 270 can be formed using the same method discussed above with respect to part 70 described in FIGS. 1-6. A bed of resin beads 275 has been slurry packed and sealed in place by the interference fit formed when lip 74 of part 70 is pressed into mating socket 274 of filter 270.

Figures 9A, 9B:
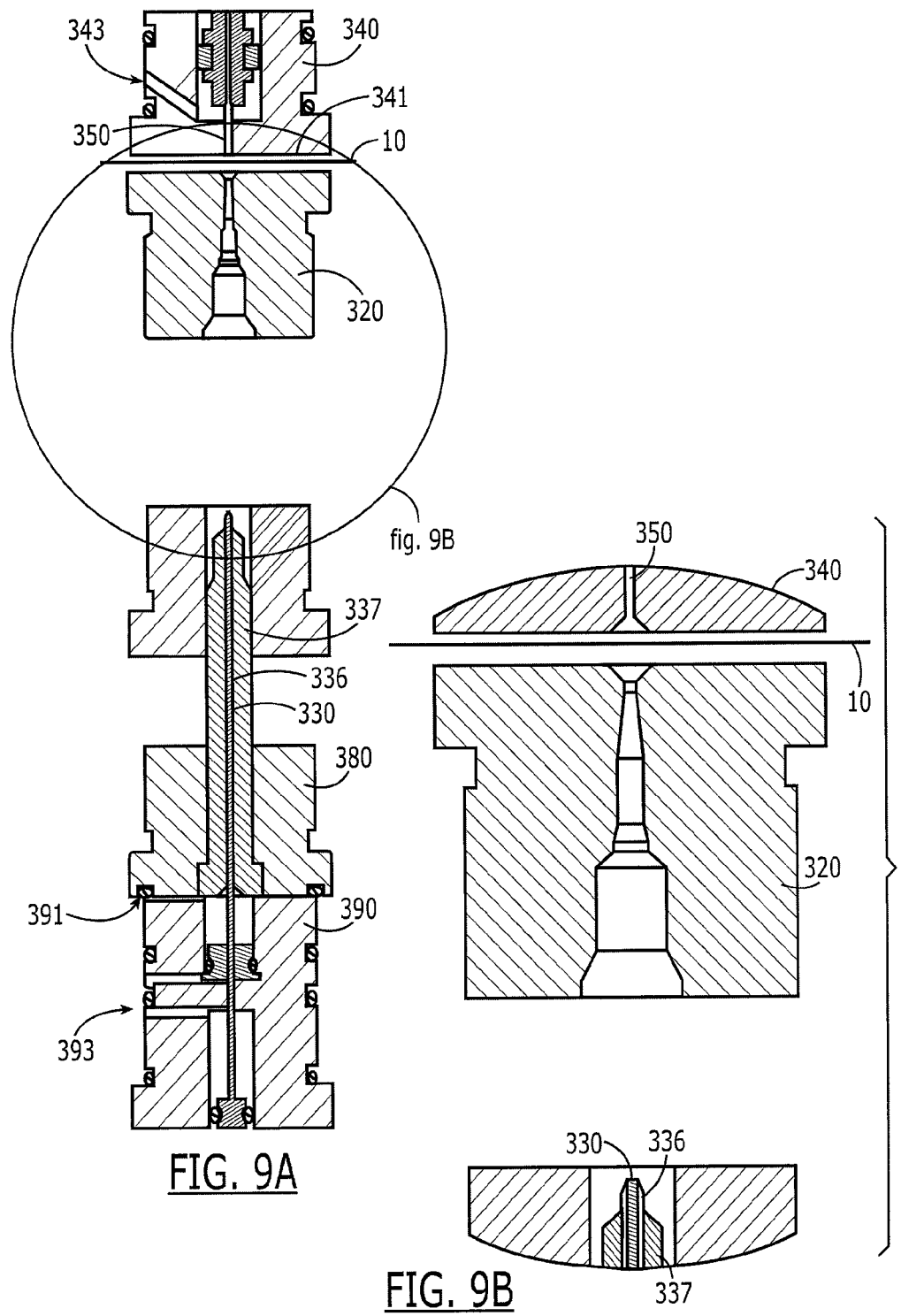
FIG. 9A is a cross-sectional view of yet another embodiment of an insert mold, showing a single core and cavity assembly designed to mold an extended tip chamber to receive microparticles, not having an embedded segment of sheet selvage.
FIG. 9B is an enlarged view of a portion of the insert mold of FIG. 9A.

FIGS. 9A and 9B illustrate another embodiment of a single station assembly of a multi-station mold for forming an extended tip unitary chamber for receiving and retaining microparticles. The tip is particularly configured to eliminate the entrapped selvage remnants present in the previous embodiments. A sheet of nonwoven 10 is shown in the idling state positioned loosely between mold cavity block 320 and a clamp block 340. Clamp block 340 contains core pin 350 which is held retracted at the position of sheet clamp surface 341 by controlled air pressure applied to port 343. Resilient core wire 330 and telescoping core sleeve piston 336 are both shown retracted, with control air pressure applied to ports 391 and 393 of cylinder block 390. Outer core sleeve 337 is retained in cover block 380 and mated to cylinder block 390, also shown here retracted in stripper block 360 in the idling state with the molding press open.

Figures 10A, 10B:
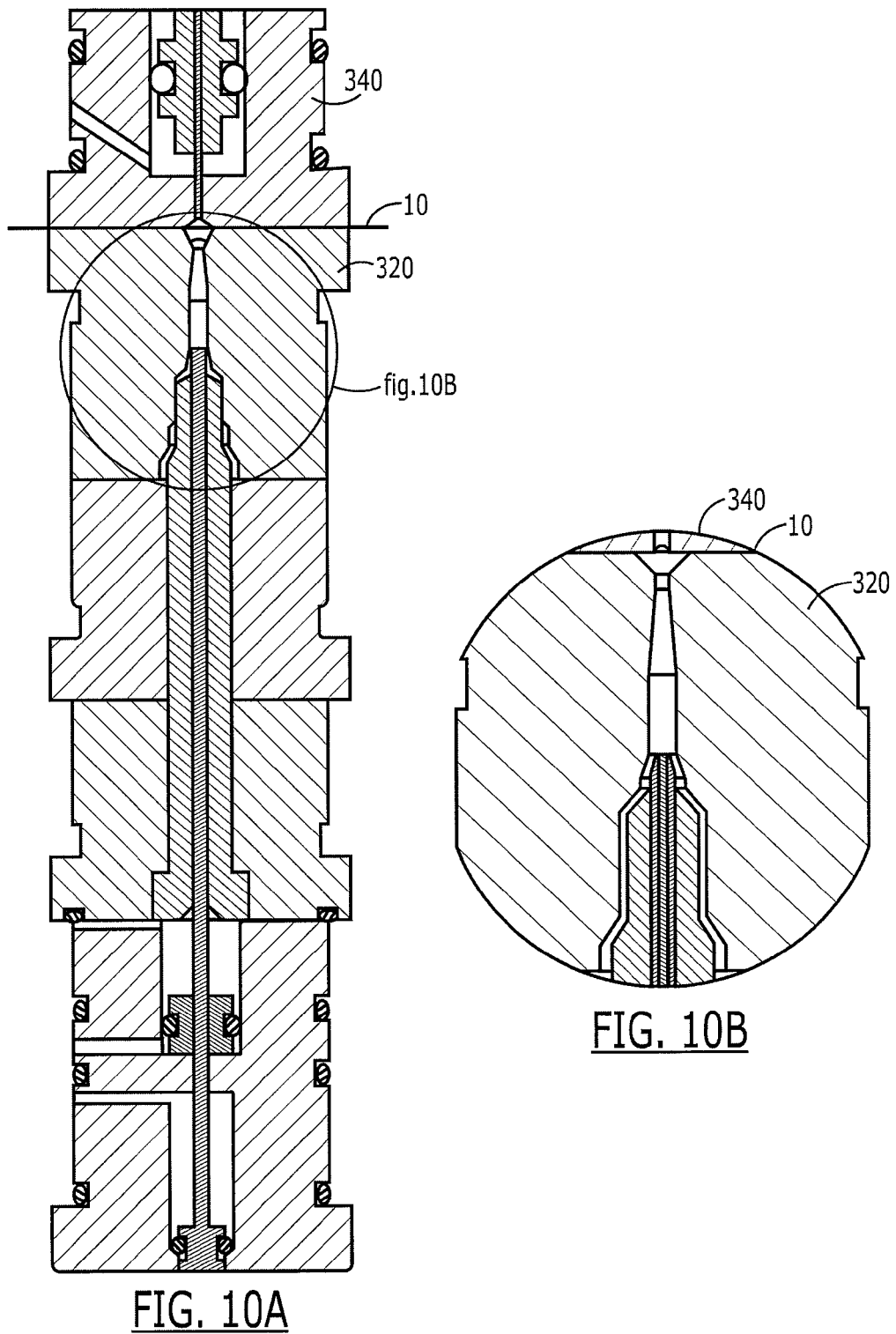
FIG. 10A is a cross-sectional view of the insert mold of FIG. 9A, showing the sheet being clamped.
FIG. 10B is an enlarged view of a portion of the insert mold of FIG. 10A.

FIGS. 10A and 10B illustrate the molding press clamped closed, clamping sheet 10 between clamp block 340 and mold cavity block 320.

FIGS. 11A and 11B illustrate control air applied to port 392 and port 391 being vented, causing telescoping core sleeve piston 336 to fully extend and precisely house the ground tip of core sleeve piston 336 against the mating wall of mold cavity block 320 at location 339.

Figure 12A:
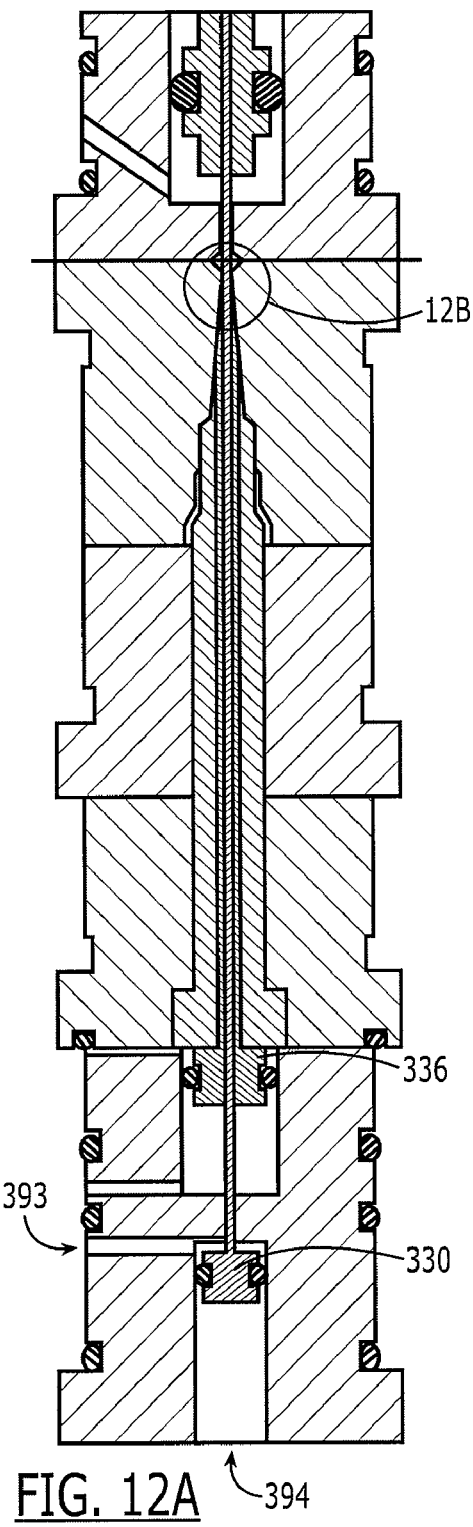
FIG. 12A is a cross-sectional view of the insert mold of FIG. 9A, showing the resilient core wire guided by the extended sleeve extended to engage a mating conical core and thereby grasp the sheet.
Figure 12B:
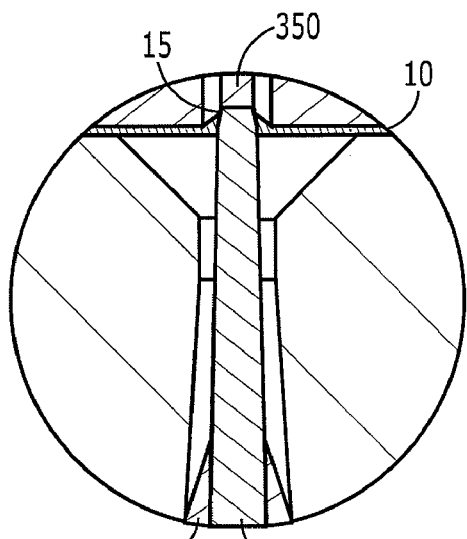
FIG. 12B is an enlarged view of a portion of the insert mold of FIG. 12A.

In FIGS. 12A and 12B, control air has been applied to port 394 and port 393 has been vented, causing resilient core wire 330 to extend through core sleeve piston 336 and deform sheet 10 into mating retracted core pin 350. The shape of resilient core wire 330 crushes a circle 15 of sheet 10 against core pin 350, leaving the central portion less crushed and more permeable.

Figure 12C:
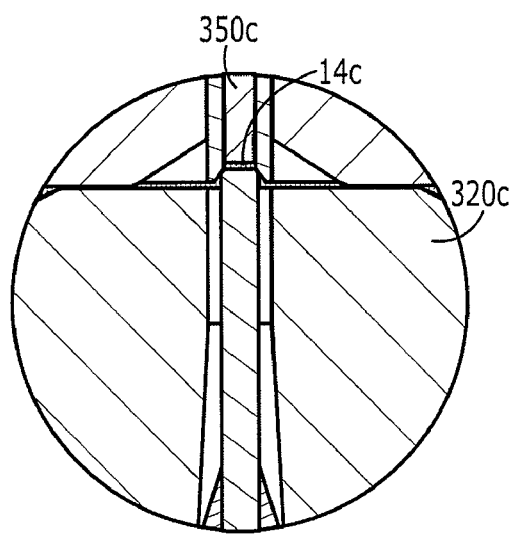
FIG. 12C is an enlarged cross-sectional view of another embodiment of a portion of an insert mold for punching a filter.

In another embodiment, the cavity block 320 and the core pin 350 can be configured to punch or cut, instead of tear, the sheet. FIG. 12C illustrates base disk 14c being grasped as in FIGS. 12A and 12B by a modified core pin 350c having a wider shoulder more closely fitting the bore of modified cavity block 320c. In this case cavity block 320c is made from fully hardened tool steel, rather than the optional use of more easily machined half hard mold steel, or preferably aluminum or copper alloy having better heat conduction suitable for cavity block 320c.

In FIGS. 13A and 13B, control air has been applied to port 344 and port 343 has been vented, causing core pin 350 to fully extend and remain firmly against shoulder 342. This is assured by use of a larger diameter for core pin 350 and clamp block 340 than for those of the opposing pneumatic core pin 330 and core sleeve piston 336. If needed, the control air for cylinder 340 can also be set higher than that used for the opposing cores. Core pin 350 has grasped and torn disk 14 free of sheet 10 and selvage 13, and placed it in position to form the tip of mold cavity block 322. Resilient core wire 330 maintains pressure against disk 14 due to air pressure on port 394 to grasp but not cut the disk, providing a frayed fringe projecting into the mold cavity block 322.

Figure 13C:
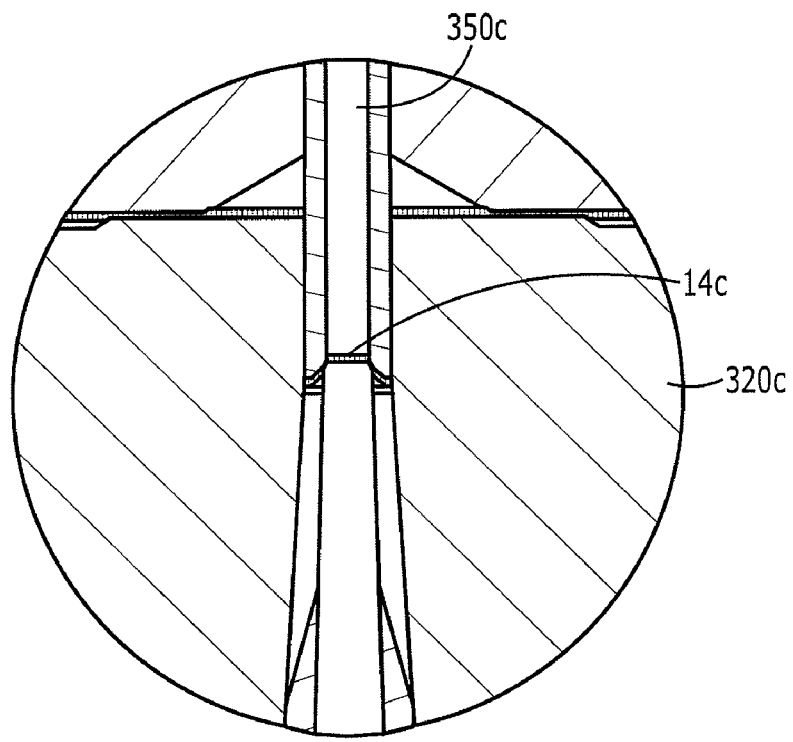
FIG. 13C is an enlarged cross-sectional view of yet another embodiment of a portion of an insert mold configured for punching a filter.

FIG. 13C is similar to FIG. 13B, except that it illustrates the disk 14c being cleanly punched into mold cavity 320c using core wire 350c and held positioned and ready to receive molten plastic. Clean punching and avoidance of excessive frayed strands extending beyond the molded tip would likely require frequent disassembly and resharpening of the cutting edges of these features, similar to the case of a conventional paper punch used repeatedly to sever a nonwoven such as Tyvek, resulting in a shorter predicted cycle life for such a tool.

Figure 13D:
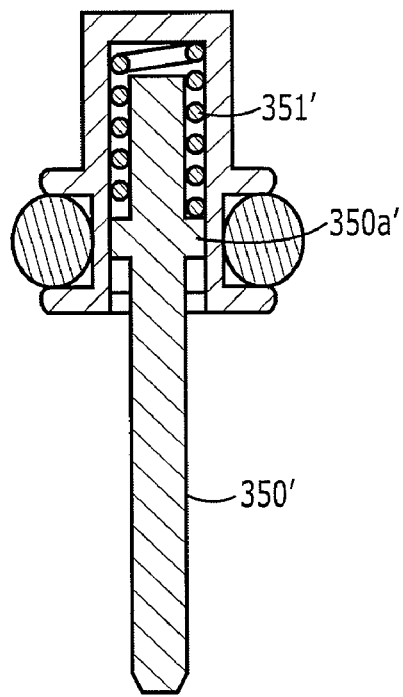
FIG. 13D is an enlarged cross-sectional view of another embodiment of a portion of an insert mold configured for tearing a filter.

In another embodiment, as shown in FIG. 13D, the core pin 350' can include a spring 351' housed therein. The spring 351' can be slightly compressed in a resting state by an annular shoulder 350a' added to core pin 350'. The biased core pin 350' can immediately grasp the selvage when pressure is applied axially by the opposing core pin (not shown), and is free to be further compressed a short distance further into the piston before the end of core pin 350' reaches the bottom of the spring chamber. These features permit grasping and tearing to be done in the same direction by the application of control air to port 394 as shown in FIGS. 12A and 12B. Subsequent application of control air to port 344 as shown in FIGS. 13A and 13B then serves to transfer the pre-torn disk into the mold chamber. Advantageously, this feature provides a smaller torn disk than is possible by tearing as shown in FIGS. 13A and 13B, because the strain is focused to the smaller diameter perimeter of core wire 330 rather than that of core pin 350.

Figure 14A:
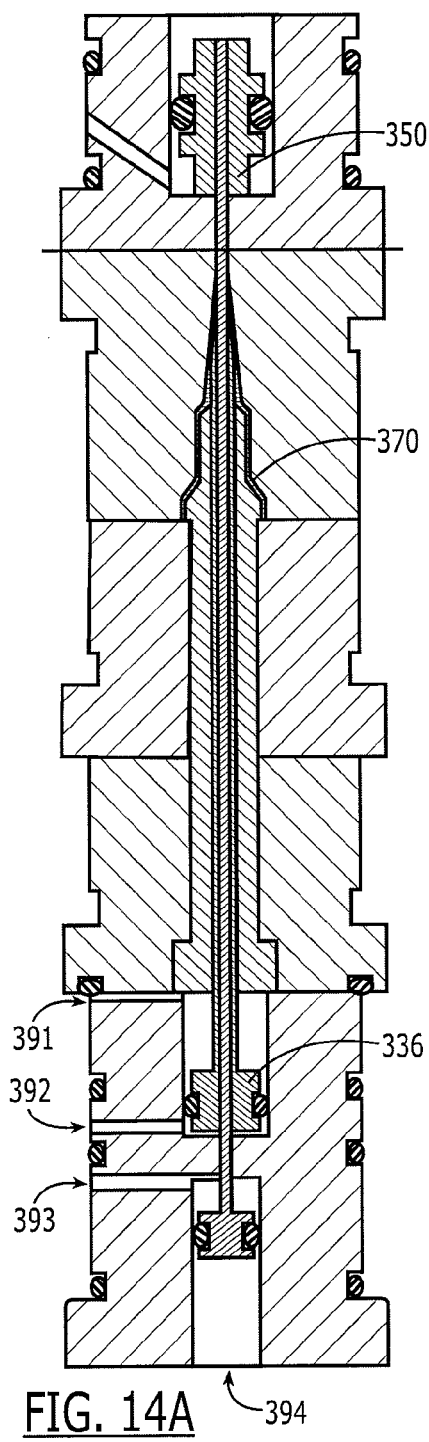
FIG. 14A is a cross-sectional view of the insert mold of FIG. 9A, showing thermoplastic having filled the entire cavity and having formed a seal to the edge of the torn segment.
Figure 14B:
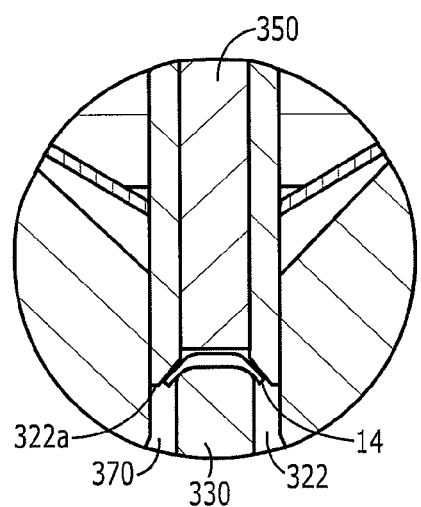
FIG. 14B is an enlarged view of a portion of the insert mold of FIG. 14A.

In FIGS. 14A and 14B, air has been applied to port 391 and port 392 has been vented to fully retract core sleeve piston 336, and then thermoplastic 370 has been injected to fill mold cavity block 322. Cooling and solidification of the thermoplastic resin 370 has caused 1-2% axial shrinkage of the molded part, leaving a gap 322a between the disk 14 and the core pin 350. To permit this without cracking the delicate perimeter seal of disk 14, control air connected to port 394 is optionally adjusted to permit retraction of resilient core wire 330 and disk 14 along with shrinking part 370, or port 394 may be vented without pressurizing port 393 as soon as thermoplastic has been packed into mold cavity block 322 and solidification and shrinkage begins.

Figures 15A, 15B:
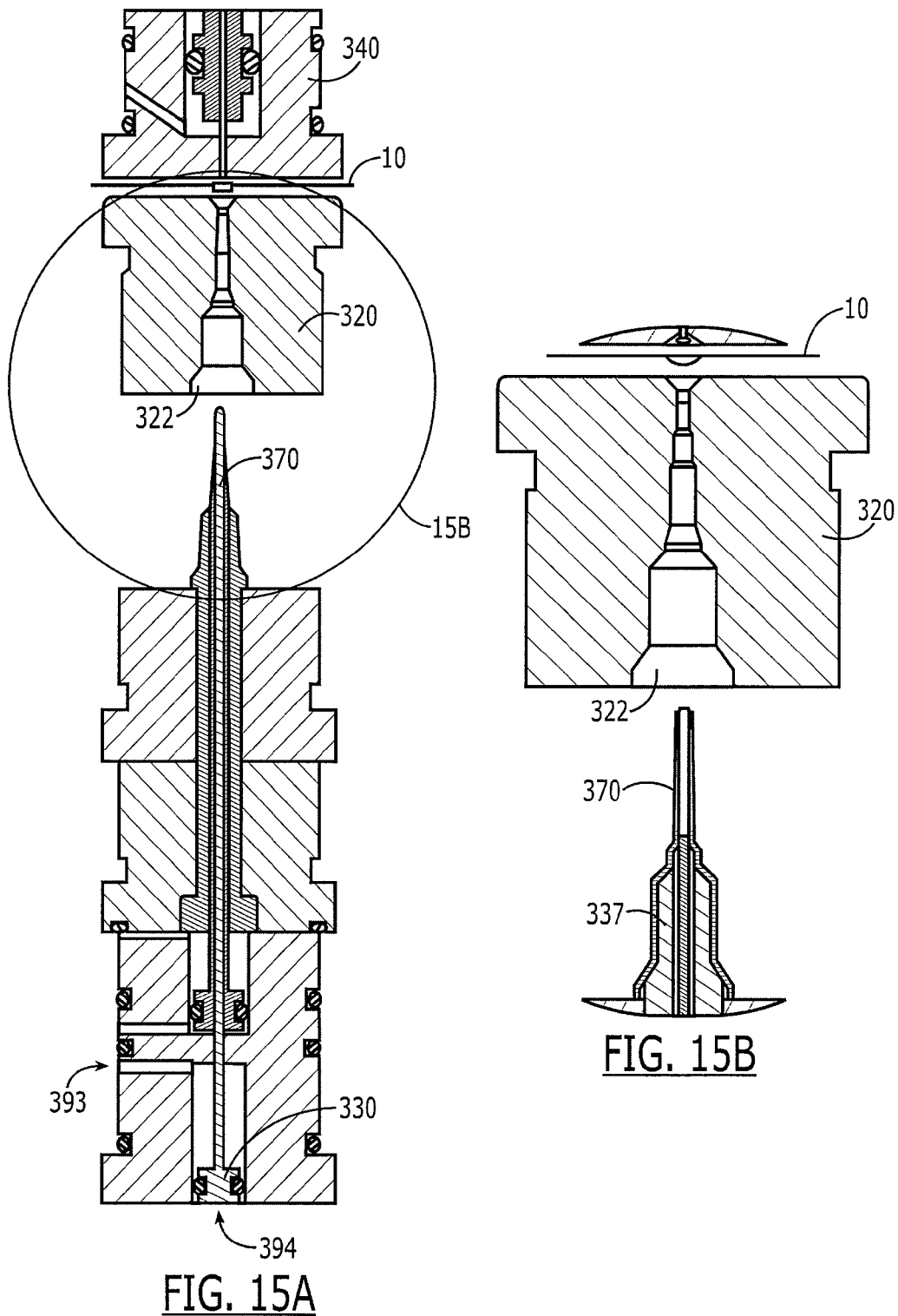
FIG. 15A is a cross-sectional view of the insert mold of FIG. 9A, showing the resilient core pin having removed the molded part.
FIG. 15B is an enlarged view of a portion of the insert mold of FIG. 15A.

In FIGS. 15A and 15B, insert molded part 370 has cooled, control air has been applied to port 393 and port 394 vented to fully retract core wire 330, and the molding press has partially opened to pull molded part 370 adhered to outer core sleeve 337 out of mold cavity block 322. Mold cavity block 320 has dropped away from clamp block 340 to release sheet 10.

Figures 16A, 16B:
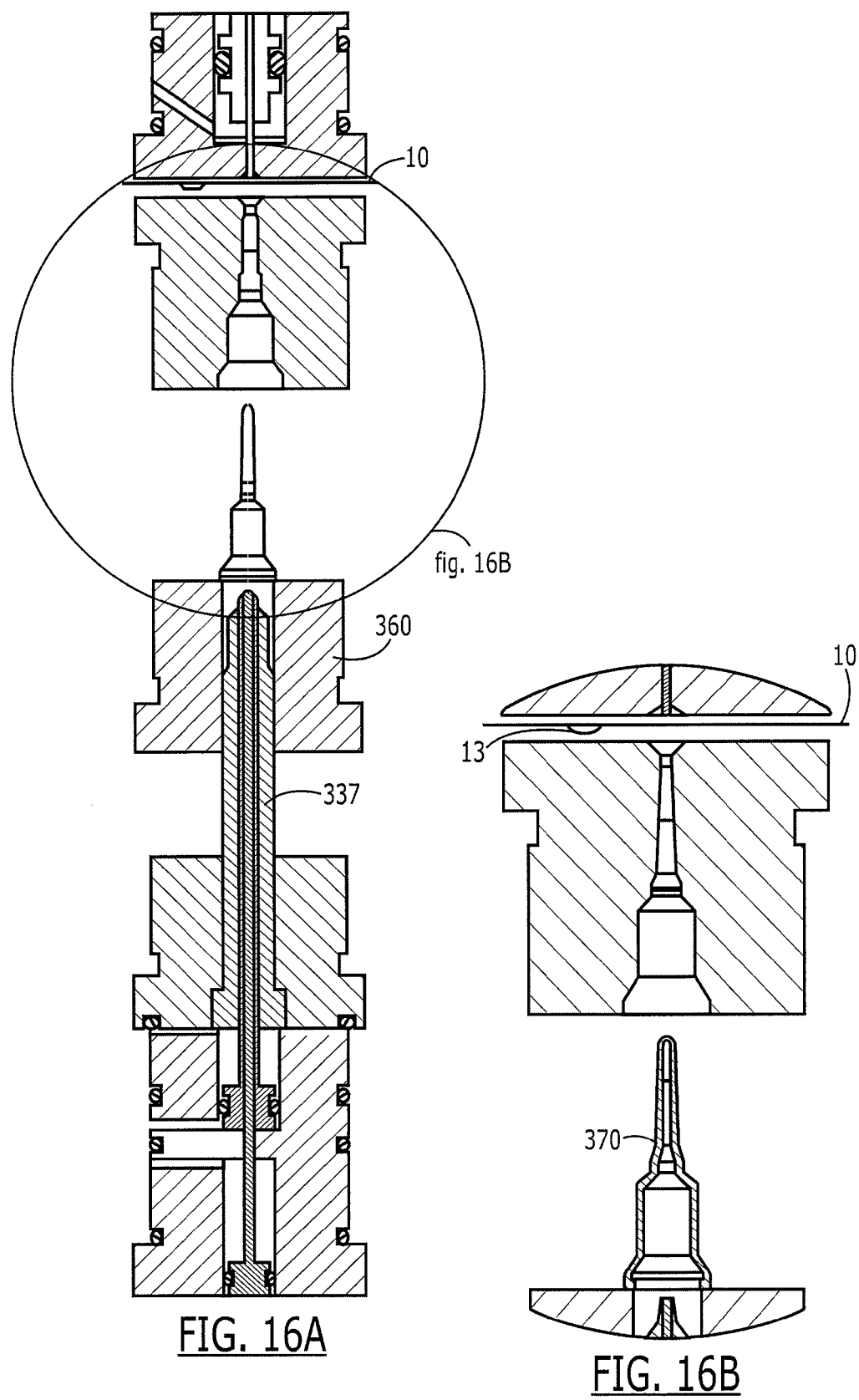
FIG. 16A is a cross-sectional view of the insert mold of FIG. 9A, showing the stripper plate having removed the formed unitary filter from the resilient core pin.
FIG. 16B is an enlarged view of a portion of the insert mold of FIG. 16A.

In FIGS. 16A and 16B, the press has completely opened causing stripper block 360 to strip part 370 from outer core sleeve 337. Sheet 10 has been advanced to move the crushed and torn selvage 13 aside. As soon as part(s) 370 and the sprue and runner, if any, have been removed, the cycle is ready to repeat.

Figure 17A:
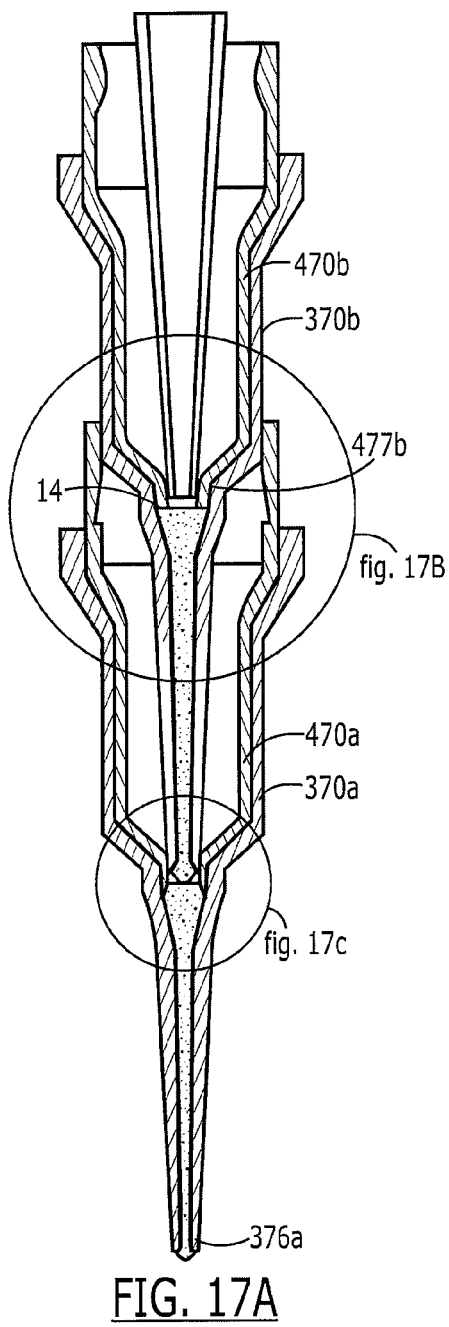
FIG. 17A is a cross-sectional view of one embodiment of a first sealed microcolumn having adsorbent particles packed in a molded part and secured by a cup and upper bed support pressed down into a mating well of the molded part, a second sealed microcolumn disposed in the first sealed microcolumn for quantitatively delivering a sample eluted from it into the first microcolumn, and a conventional 10 uL pipet tip inserted in the cup of the second sealed microcolumn to illustrate the ability to deposit a sample of just a few uL without introduction of air bubbles.
Figure 17B:
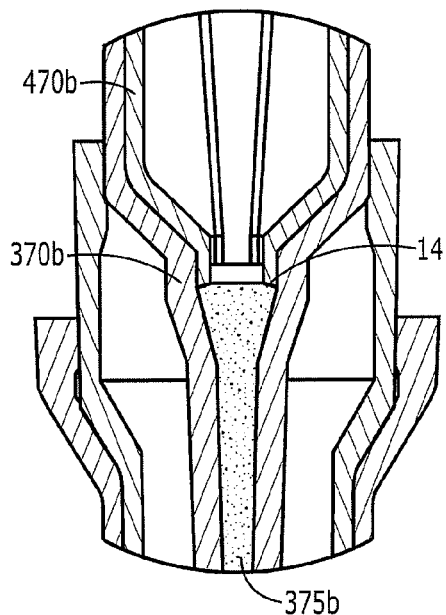
FIG. 17B is an enlarged view of a portion of the assembly of FIG. 17A.
Figure 17C:
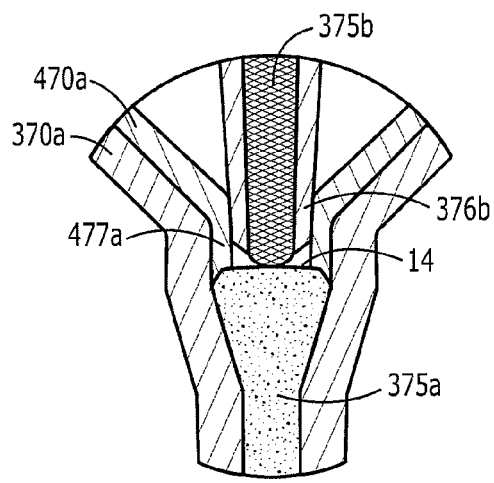
FIG. 17C is an enlarged view of another portion of the assembly of FIG. 17A.

Some uses of this embodiment are illustrated in FIGS. 17A-17C. Two different sealed microcolumns are shown, each containing a packed bed of a different type of resin bead. As shown, lower column 370a is seen packed with beads 375a and then sealed with upper support and cup 470a. An exemplary method for manufacturing the cup 470a is described below with respect to FIGS. 18-23. The tip 376b of a second column 370b packed with beads 375b is press-fit sealed in fluid tight engagement into the throat 477a of upper support and cup 470a. Application of pressure to port 477b or suction to tip 376a, or centrifugal force to the assembly may be used to quantitatively move a relatively small volume of fluid through the stacked beds for elution of sample from bed 375b and capture on bed 375a. For sample introduction without entrapment of small air bubbles (critical for use in convective ELISA, as described in US2006/0019407A1), a conventional 10 uL pipette tip is shown inserted loosely into throat 477b just above molded-in support 14 of cup 470b. The engagement of the shoulder of lower column 370b by the lip of cup 470a in FIG. 17B also illustrates the ability of the present invention to be used with an air displacing pipettor hub (not shown) in place of the upper microcolumn to perform microvolume batch adsorption and desorption. A further possible variation is to suspend a single microcolumn by the lip of lower column 370 in a 0.6 mL microcentrifuge tube (not shown) to provide centrifugal desalting or batch adsorption/desorption of microvolume samples.

Figures 18A, 18B:
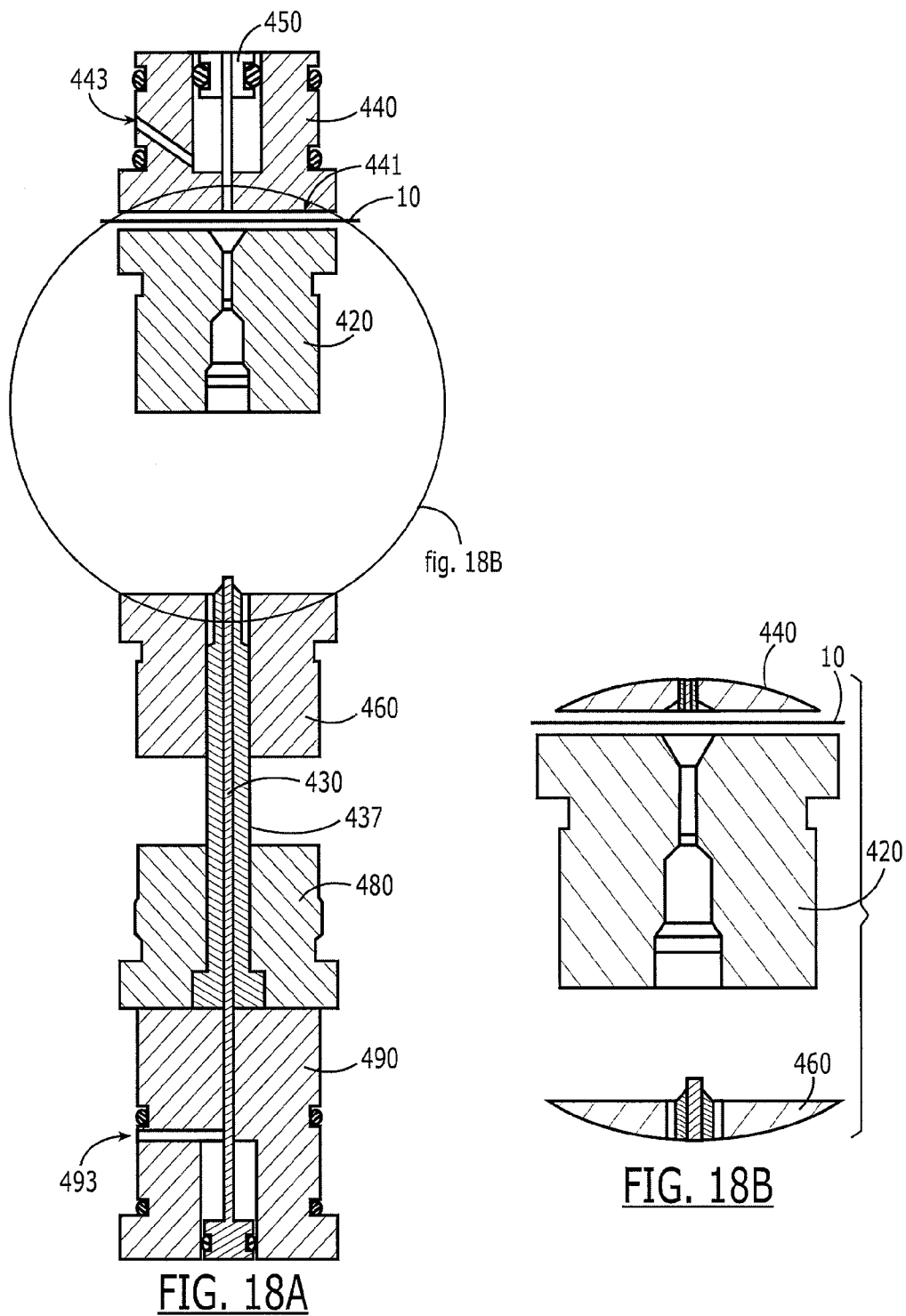
FIG. 18A is a cross-sectional view of yet another embodiment of a single core and cavity assembly designed to mold another embodiment of a cup and upper bed support that does not include an embedded segment of sheet selvage.
FIG. 18B is an enlarged view of a portion of the assembly shown in FIG. 18A.

FIGS. 18A and 18B illustrate another embodiment of a single station assembly of a multi-station seven plate automatic mold to produce yet another embodiment of a unitary cup and upper support. As previously discussed with respect to FIGS. 9A and 9B, a sheet of nonwoven 10 is shown in the idling state positioned loosely between mold cavity 420 and a clamp block 440. Block 440 contains core pin piston 450 which is held retracted at the position of sheet clamp surface 441 by controlled air pressure applied to port 443. Core wire 430 is shown retracted, with control air pressure applied to port 493 of cylinder block 490. Outer core sleeve 437 is retained in cover block 480 and mated to cylinder block 490, also shown here retracted in stripper block 460 in the idling state with the molding press open.

Figures 19A, 19B:
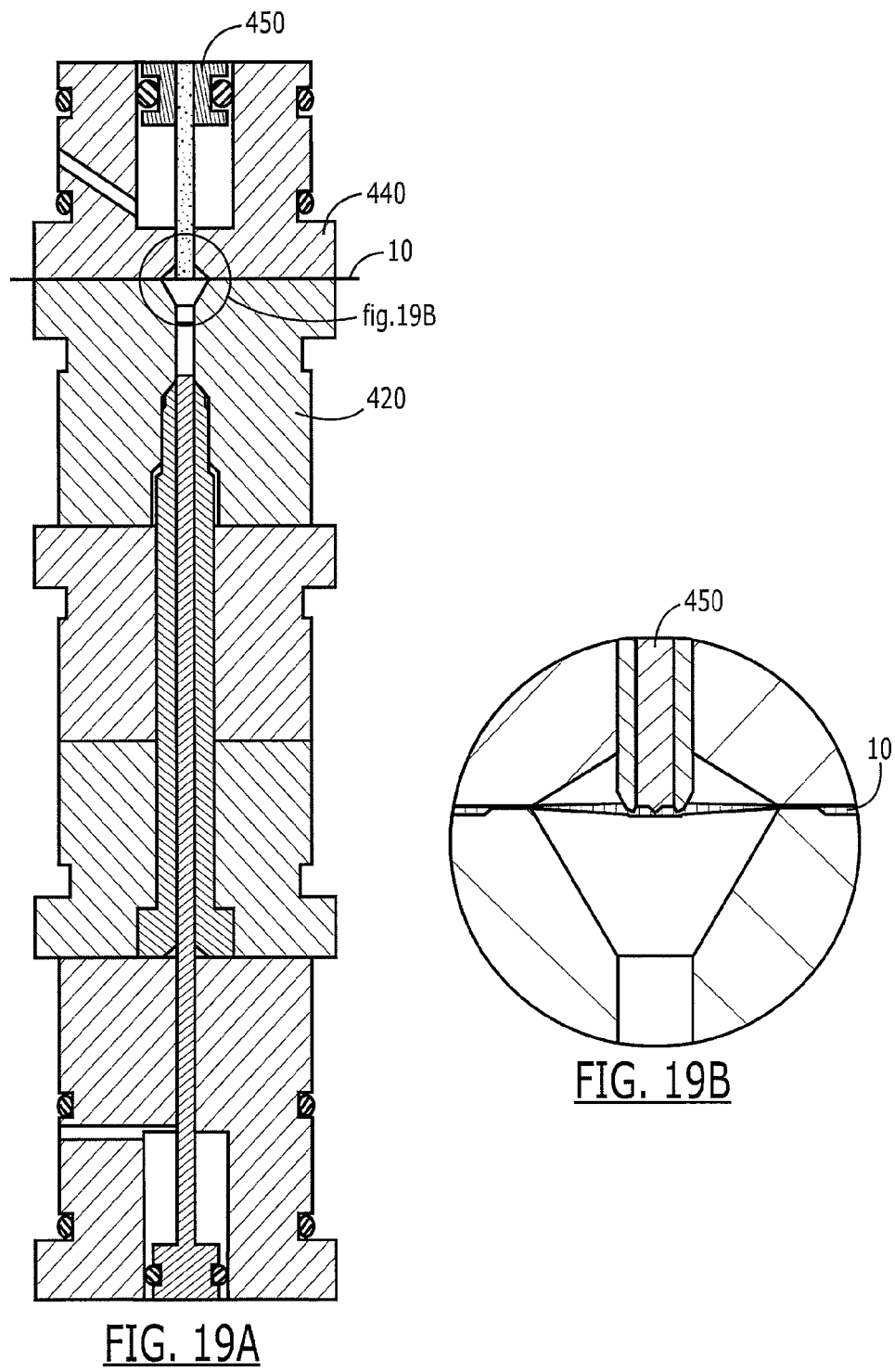
FIG. 19A is a cross-sectional view of the assembly of FIG. 18A, showing a sheet being clamped.
FIG. 19B is an enlarged view of a portion of the assembly of FIG. 19A.

In FIGS. 19A and 19B, the molding press is shown clamped closed, clamping sheet 10 between clamp block 440 and mold cavity block 420. Retracted core pin piston 450 slightly deflects sheet 10.

Figures 20A, 20B:
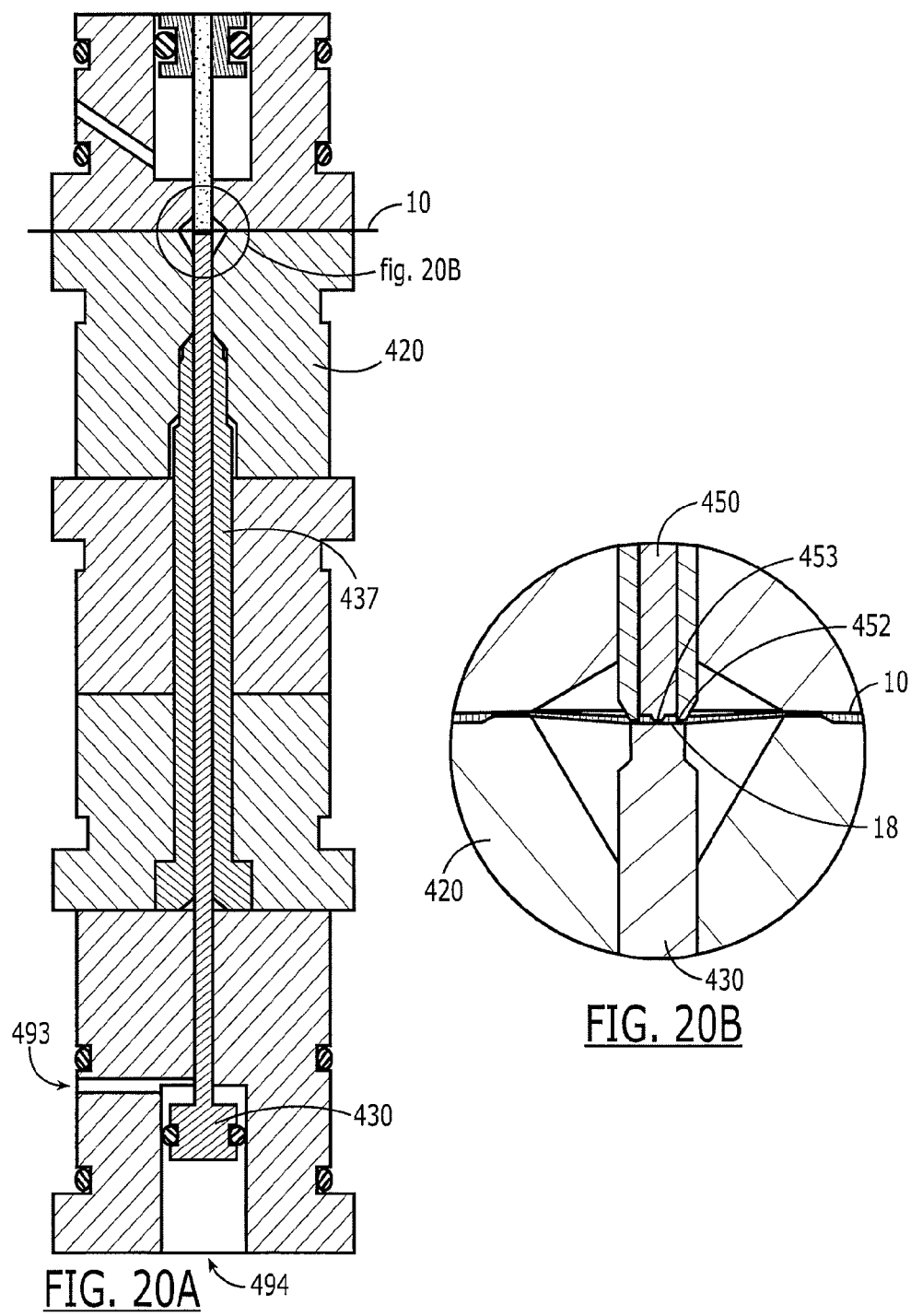
FIG. 20A is a cross-sectional view of the assembly of FIG. 18A, showing the resilient core wire extended to engage the retracted moveable core and thereby grasp the sheet.
FIG. 20B is an enlarged view of a portion of the assembly of FIG. 20A.

In FIGS. 20A and 20B, control air has been applied to port 494 and port 493 has been vented, causing core wire 430 to extend through outer core 437 and cavity block 420 and deform sheet 10 against shoulder 452 and central boss 453 of retracted conical core pin piston 450. These features leave the central annular portion 18 of sheet 10 less crushed and more permeable.

Figure 21A:
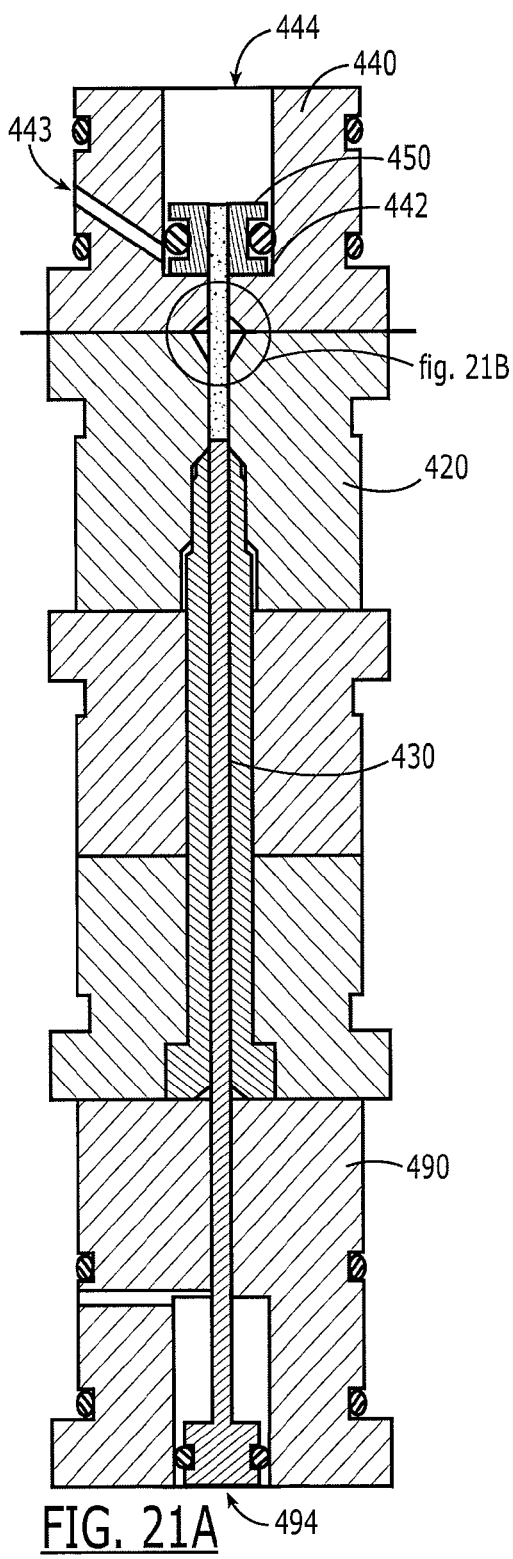
FIG. 21A is a cross-sectional view of the assembly of FIG. 18A, showing the moveable core pin fully extended, having thereby torn a segment of filter, and separated the segment from the body of the sheet.
Figure 21B:
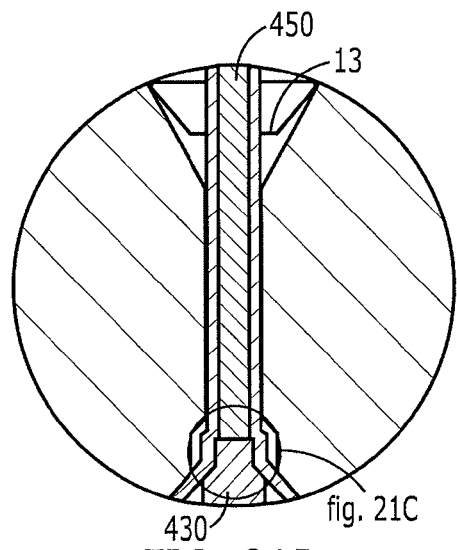
FIG. 21B is an enlarged view of a portion of the assembly of FIG. 21A.
Figure 21C:
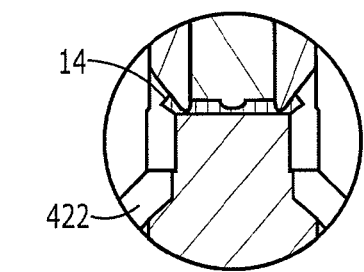
FIG. 21C is an enlarged view of a portion of the assembly of FIG. 21B.

In FIGS. 21A-21C, control air has been applied to port 444 and port 443 has been vented, causing core pin piston 450 to fully extend and remain firmly against shoulder 442. This is assured by use of a larger diameter for core pin piston 450 and cylinder 440 than for that of the opposing pneumatic core wire 430. If needed, the control air for cylinder 440 can also be set higher than that used for the opposing core. Core pin piston 450 has grasped and torn disk 14 free of sheet 10 leaving selvage 13, and placed it in position to form the tip of mold cavity 422. During the tearing stroke of core pin piston 450, resilient core wire 430 maintains pressure against disk 14 due to air pressure on port 494 to grasp but not cut the disk, providing a frayed fringe projecting into cavity 422. Although core wire 430 is shown here fully retracted against the bottom of cylinder 490 by the action of core pin piston 450, pressure may optionally remain applied to port 494 and core wire 430 can be machined shorter and allowed to float in resilient contact with disk 14.

As further shown in FIGS. 21B and 21C, the perimeter of the terminal end of core pin piston 450 can have a tapering configuration. In particular, an outer surface of the terminal end can include a shoulder which converges toward core wire 430, decreasing in diameter radially from the axis of the cavity. This feature permits controlled diminishing intrusion of the molten plastic into the margin of the torn disk as the melt fills the cavity. The result is a robust flexible weld between the plastic wall and the embedded disk, without flashing of melt into the central portion of the disk.

Alternatively, this tapering intrusion shoulder on core pin piston 450 may be replaced with a stepped shoulder to provide embedding of the perimeter of the severed central portion. The stepped shoulder could also or alternatively be added to the core wire 430. The stepped shoulder may be advantageously used when the severing of the central portion is done by punching or cutting the perimeter of the core which has a close fit to the bore of cavity 420 or 440. In such a configuration, the cavity 420 and/or cavity 440 is preferably constructed from hardened tool steel to provide a die action and is designed without the countersinks shown in FIGS. 9-16 and 18-23.

Figure 22A:
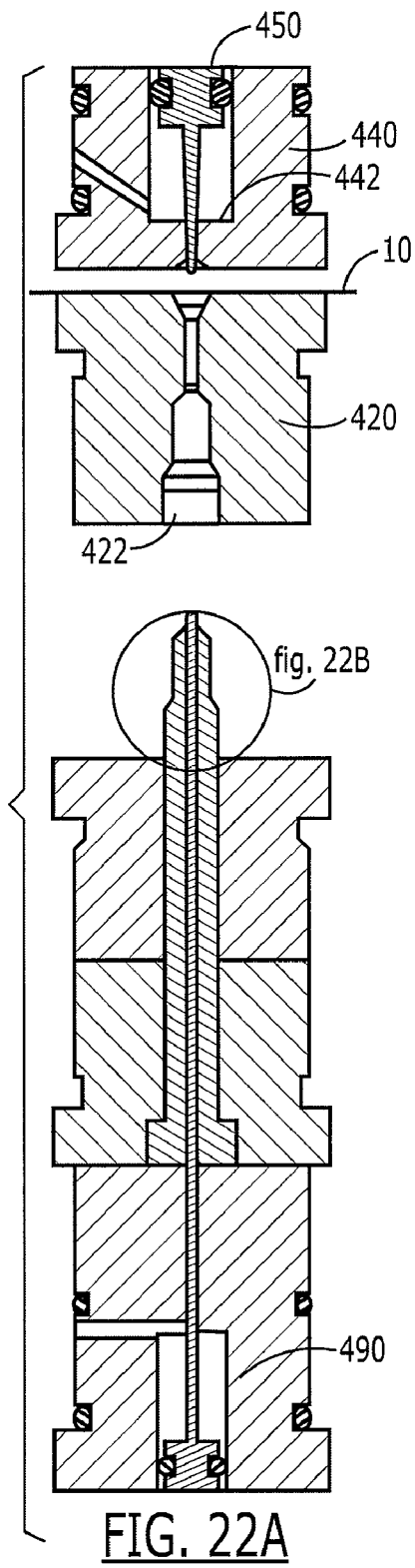
FIG. 22A is a cross-sectional view of the assembly of FIG. 18A, showing thermoplastic injected and cooled, and the resilient core pin removed to remove the insert molded cup and upper bed support.
Figure 22B:
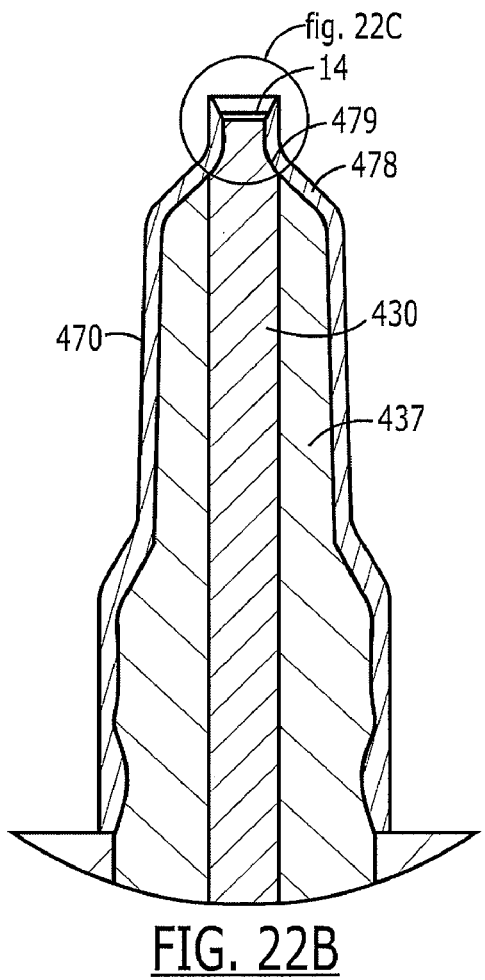
FIG. 22B is an enlarged view of a portion of the assembly of FIG. 22A.
Figure 22C:
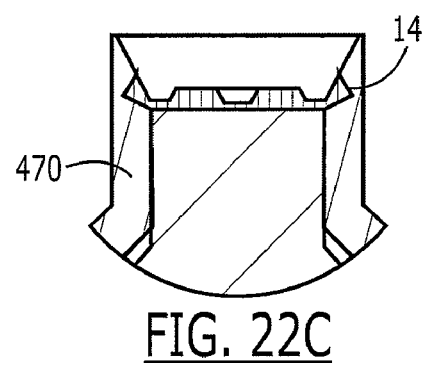
FIG. 22C is an enlarged view of a portion of the assembly of FIG. 22B.

In FIGS. 22A-22C, thermoplastic 470 has been injected to fill cavity 422, insert molded part 470 has cooled, and the molding press has partially opened to pull part 470 adhered to core sleeve 437 out of cavity 422. Cavity block 420 has dropped away from clamp block 440 to release sheet 10. Cooling and solidification and axial shrinkage of resin 470 causes much less stress on disk 14 in the molded cup 470, compared to part 370 previously discussed, because cup shoulder 478 has a bold profile and it is adjacent to disk 14, so most axial shrinkage occurs in the majority length of the part opposite the disk beyond the shoulder, and the stress of this shrinkage is carried by shoulder 478. For purpose of smooth drainage of fluid, it is desired to maintain the smallest possible ridge on the molded inner surface of shoulder 478 at point 479 where core wire 430 emerges from outer core 437. This will be encouraged by close fitting the length of core wire 430 when bottomed in cylinder 490 to that of outer core 437 so that their respective conical features forming shoulder 478 are congruent. This removes resiliency from core wire 430 when core pin piston 450 has bottomed on surface 442. A length adjusting feature in core pin piston 450 similar to the set screw shown in core 30 of FIG. 1A may then be of benefit in tuning the mold to accommodate nonwovens of differing mean thickness.

Figure 23A:
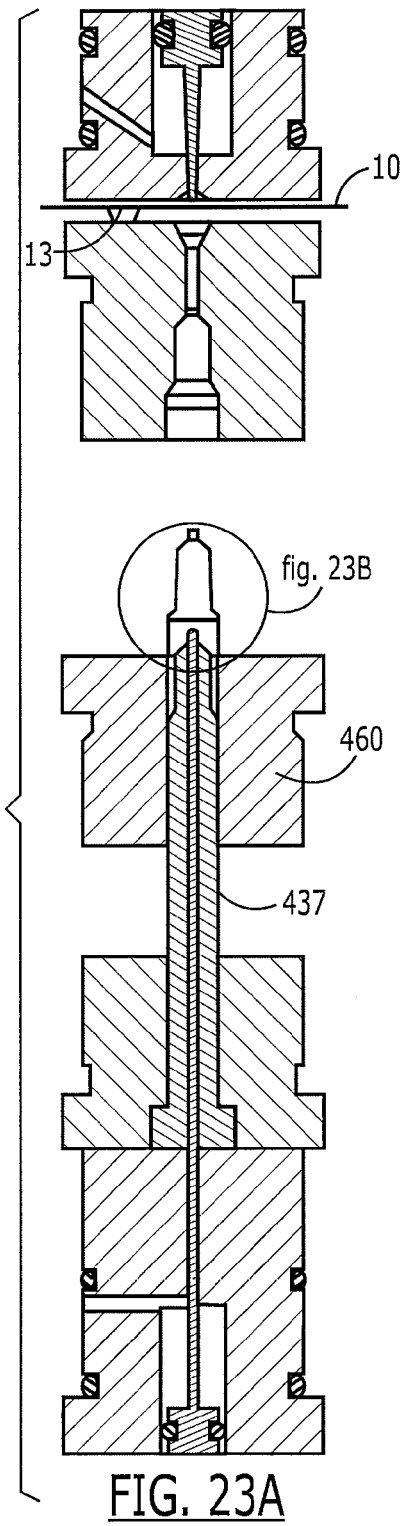
FIG. 23A is a cross-sectional view of the assembly of FIG. 18A, showing the stripper plate having removed the formed unitary filter from the resilient core pin.
Figure 23B:
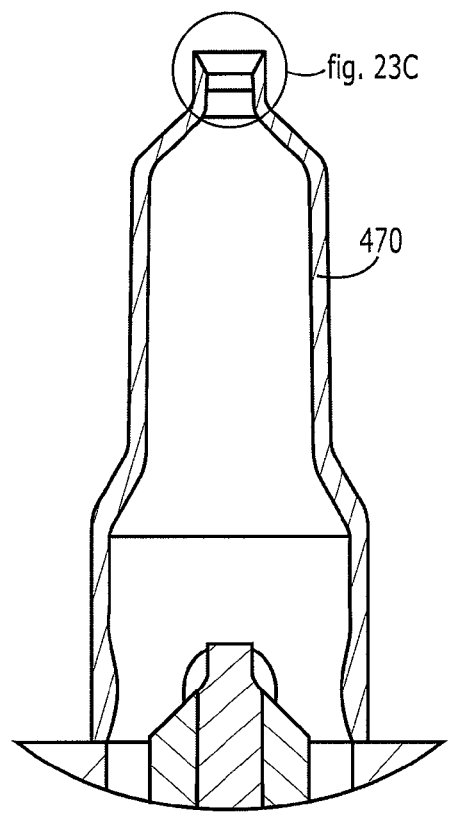
FIG. 23B is an enlarged view of a portion of the assembly of FIG. 23A.
Figure 23C:
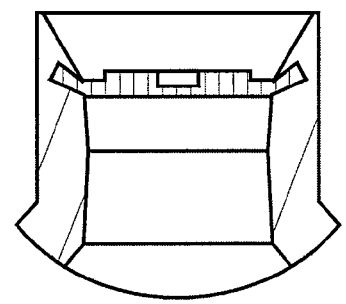
FIG. 23C is an enlarged view of a portion of the assembly of FIG. 23B.
Figure 24A:
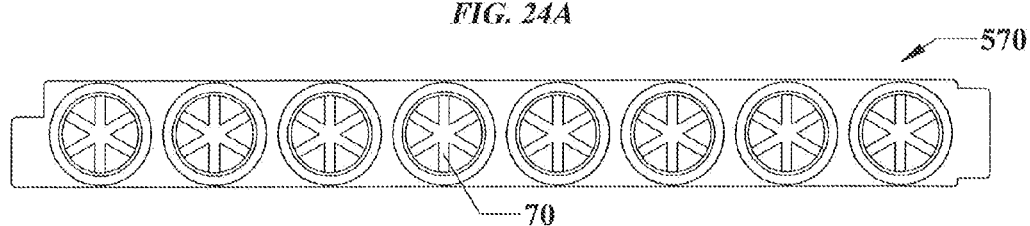
FIG. 24A is a side view of one embodiment of a unitary strip of eight filtration wells having a 9 mm spacing and integral support ribs formed below each filter well.
Figure 24B:
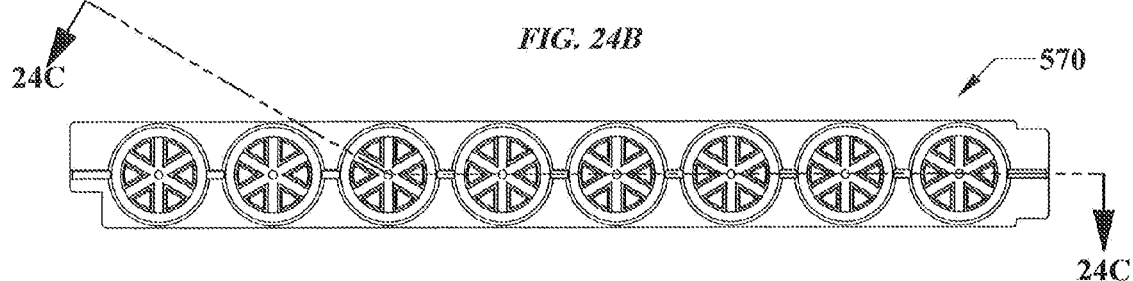
FIG. 24B is a top view of the strip of FIG. 24A.
Figure 24C:
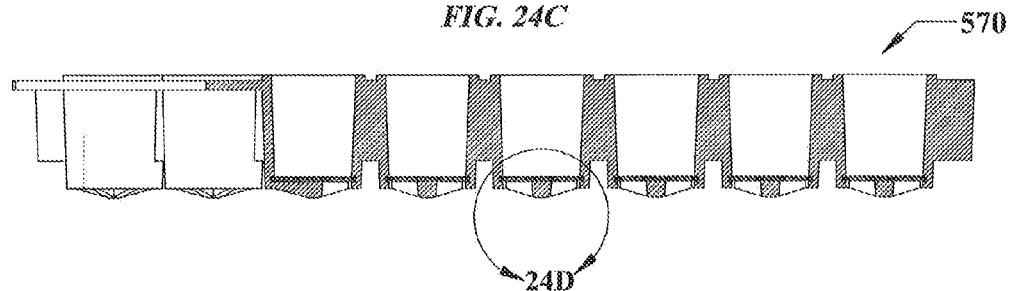
FIG. 24C is a cross-sectional view of the strip of FIG. 24B.
Figure 24D:
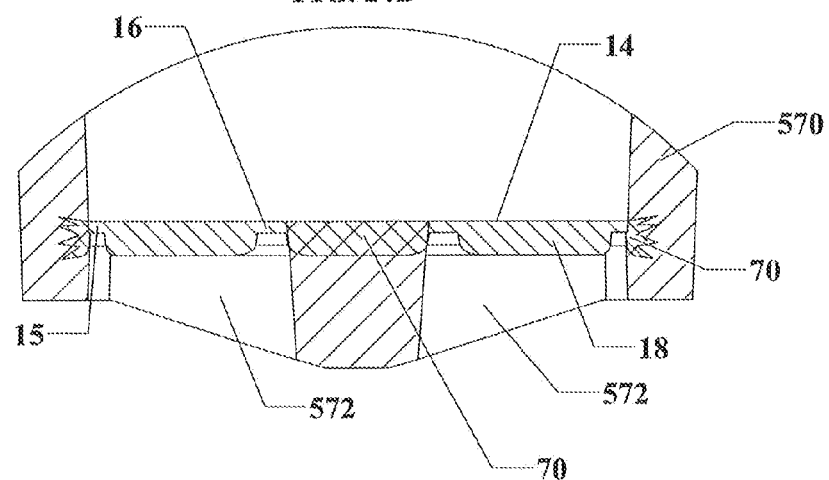
FIG. 24D is a cross-sectional view of a portion of the strip of FIG. 24C.

In FIGS. 23A-23C, the press has completely opened causing stripper block 460 to strip part 470 from outer core sleeve 437. Sheet 10 has been advanced to move the crushed and torn selvage 13 aside. As soon as part(s) 470 and the sprue and runner, if any, have been removed, the cycle is ready to repeat.

Figures 25A, 25B:
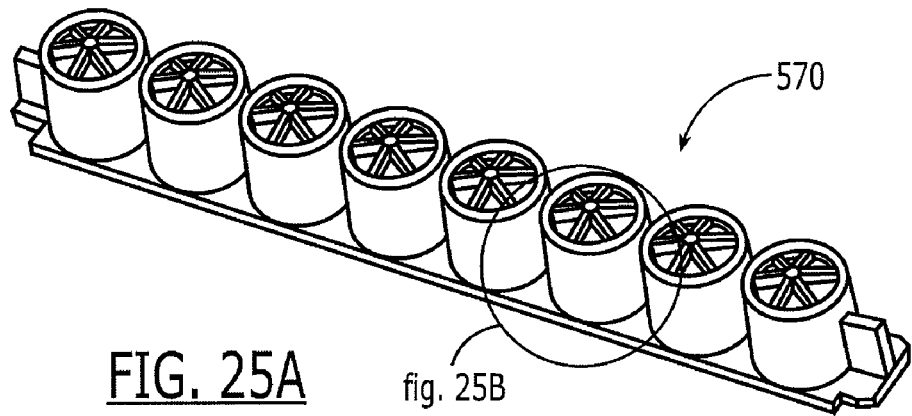
FIG. 25A is a perspective view of the strip of FIG. 24A.
FIG. 25B is a perspective view of a portion of the strip of FIG. 25A.
Figure 25B:
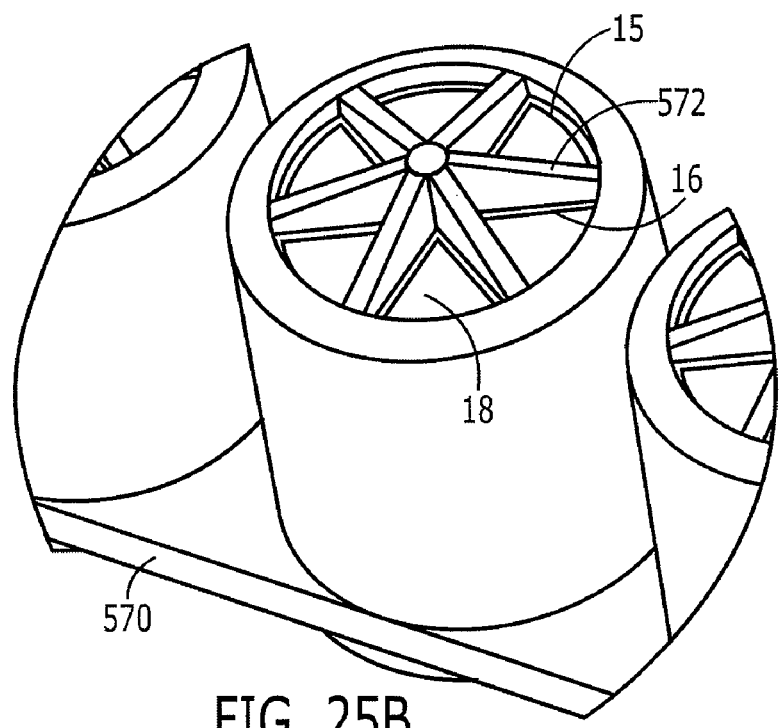

FIGS. 24A-25B illustrate another embodiment of a unitary strip 570 of eight filtration wells having a 9 mm spacing and integral support ribs 572 formed below each filter well. As explained in paragraph [0019], the second core pin of the injection molding device can have an interconnecting system of slots configured to form the integral molded supporting members or ribs beneath the central portion of filter. The same method may be employed to insert mold the commonly used 8×12 array of 96 wells, or higher multiples of smaller wells such as 384 or beyond. As shown in FIGS. 24A-25B, each well is formed by a tubular wall with a fluid-permeable filter disposed across the tubular wall proximate a bottom open end of the tubular wall. The filter is formed by torn disk 14 having a frayed edge and flow segments 18 which are uncrushed, bounded by outer thin compressed segments 15 proximate the disk edge, and radial compressed segments 16 delimiting each rib. The edge of the disk 14 is embedded in the tubular wall of the well to form a unitary mold. As in the other embodiments, the uncrushed regions 18 are formed by relieved areas in one core, and the crushed areas serve to both grasp the disk as it is torn free of the external sheet, and to prevent intrusion of molten thermoplastic 70 into the porous regions during the unitary insert molding process. The tubular wall can have a filter remnant embedded therein or can be free of filter remnants as in the other embodiments. As shown in FIGS. 25A and 25B, the inner compressed segments 16 can be disposed radially around a central portion of the tubular wall. In addition, a packed bed of adsorbent particles (not shown) can disposed within the well and can include porous or nonporous adsorbent particles.

The following non-limiting examples serve to further illustrate various exemplary embodiments of the invention:

EXAMPLE 1

An automated mold, as shown in FIGS. 9-16 and 18-23 but containing a spring-biased resilient tear core as previously described, was constructed as a dual chamber family tool and initially sampled without use of temperature-controlled water re-circulation to produce one of each of the parts shown in FIG. 17 for each cycle of the mold. Disk ring gates were used to deliver a uniformly-sheared polypropylene melt to each chamber by means of a melt delivery system designed according to U.S. Pat. No. 6,503,438 entitled "Method and Apparatus for Balancing Flow Conditions of Laminar Flowing Materials," which is hereby incorporated by reference in its entirety. A polypropylene copolymer molding resin having a high melt flow (31 g/10 min) was plasticized for at least 12 minutes in a pneumatic Morgan Press G-100T molding machine with the injection barrel temperature set to 425° F. and the check valve nozzle set to 450° F. The mold was clamped at 10 tons of force, and disks were then torn within 2 seconds into the cavities using 45-70 psig of compressed air pressure on the core and sleeve pistons, and 110 psig of air pressure on the tear pistons. Plastic was then immediately injected at 3,000 psig of nozzle pressure. The injection speed was varied from a setting of 5.5 (full) of the injection throttle valve with the mold at ambient temperature down to a setting of 1.5 as the mold warmed with use, in order to fully pack the part cavities without plugging the center portion of the embedded filter. The mold remained clamped for 22 seconds for tearing, injecting, packing and cooling. The core and tear pistons were retracted, then the mold was unclamped and the parts were automatically stripped from the core pins as the mold platen reached its fully open position. The thin disk ring gates were severed to free the parts from the runner system after removal from the molding press using rotary dies.

Figure 26:
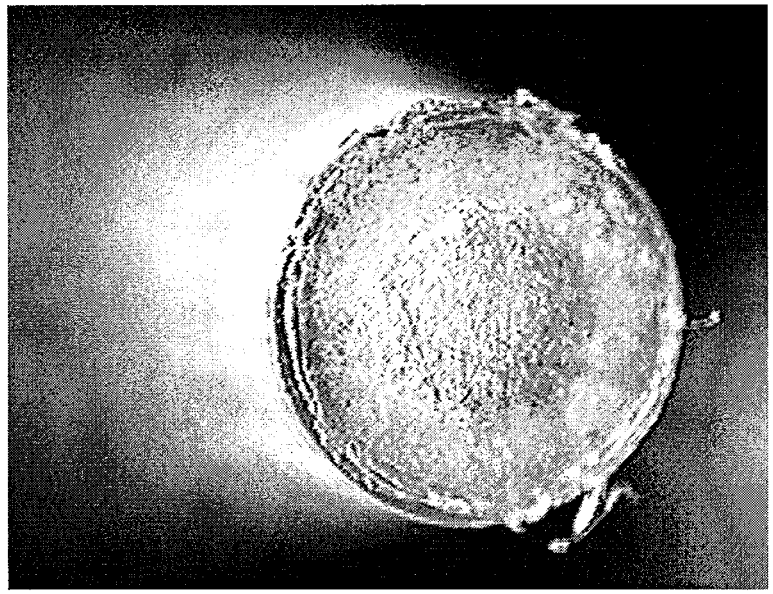
FIG. 26 is a photomicrograph of one embodiment of an insert mold in accordance with the present invention.
Figure 27:
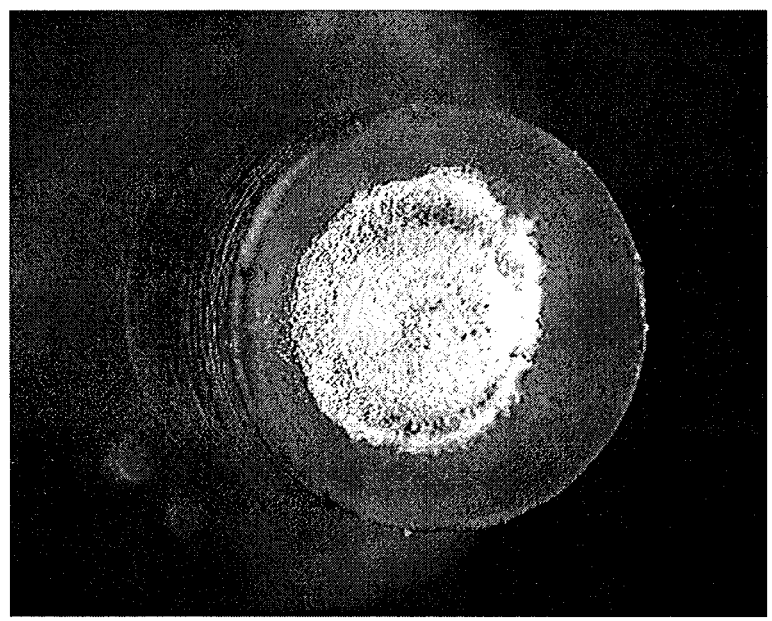
FIG. 27 is a photomicrograph of another embodiment of an insert mold in accordance with the present invention.

A photomicrograph of a molded base 370 is shown in FIG. 26. A photomicrograph of a molded cup 470 is shown in FIG. 27, showing the frayed torn edge fully embedded in the molded rim of the cup tip, without visible intrusion of the melt into the porous center region.

Each part having a visibly-integral embedded torn filter was tested for water permeability on a test stand which inserted a sealing probe into the part, valved to a reservoir of deionized water pressurized to 120 psig above ambient for 15 seconds. Permeate was collected in a graduated test tube and the volume recorded. The results from 26 consecutive mold cycles are set forth below in Table 1.

TABLE 1

| 15 sec 120 psig Water Flow Data for Devices From Initial Mold Sampling | | | |
|---|---|---|---|
| Molding Cycle # | Melt Inject Speed | Base Water Flow (mL) | Cup Water Flow (mL) |
| 1 | 5.5 | 1.3 | 2.9 |
| 2 | 5.5 | 0.8 | 3.5 |
| 3 | 5.5 | 0.1 | 0.3 |
| 4 | 3.0 | 0.2 | 1.5 |
| 5 | 2.0 | 1.1 | 1.6 |
| 6 | 1.5 | 0.2 | 13 (leak) |
| 7 | 1.75 | 2.0 (void) | 4.0 |
| 8 | 1.75 | No Disk | 4.5 |
| 9 | 1.75 | 0.5 | 2.2 |
| 10 | 1.75 | 0.1 | 7.5 (void) |
| 11 | 1.8 | 0.2 | 1.3 |
| 12 | 1.6 | 0.5 | 1.1 |
| 13 | 1.6 | 0.2 | 1.2 |
| 14 | 1.5 | 0.3 | 1.1 |
| 15 | 1.5 | 1.0 | 3.0 |
| 16 | 1.5 | 0.2 | >15 |
| 17 | 1.6 | 1.1 | 8.8 (void) |
| 18 | 1.6 | 0.4 | 15 (leak) |
| 19 | 1.6 | 1.0 | 11 (leak) |
| 20 | 1.6 | 0.6 | 1.0 |
| 21 | 1.6 | 0.6 | 3.3 |
| 22 | 1.6 | 0.7 | 0.5 |
| 23 | 1.6 | 0.2 | 0.8 |
| 24 | 1.5 | 0.5 | 0.6 |
| 25 | 1.5 | 0.6 | 3.0 |
| 26 | 1.5 | 0.6 | 1.1 |

Only one of the 52 parts tested had a missing filter (base #7). The central portion was seen to have been left attached to the selvage strip. Water flows for the other 25 base parts 370 ranged from 0.1 to 2.0 mL. The highest flow device had a disk with a larger void pore seen to be present randomly in the parent nonwoven sheet. None of the bases had defective edge seals.

Three of the molded cups 470 had water flows above 10, and all of these had visible cracks in the perimeter seal to the wall upon exposure to 120 psi for 15 sec. Two other cups had flows of 7.5 and 8.8 mL, and both of these were seen to have larger void pores in the central portion of the disk, with intact perimeter seals. The remaining cups had water flows ranging from 0.3 to 4.5 mL.

The data demonstrates that even when the mold is operated in a mixed family mode, the disclosed invention can produce unitary insert molded filtration devices having good permeability, which are robust enough to withstand pressure drops across the encapsulated filter of up to 120 psi. This pressure is at the upper end of that needed for the intended use. The 3 observed seal failures in part 470 may have been caused in part by the high stress exerted by the test water on the part in the absence of the designed packed bead bed 375, which provides mechanical support to the filter 14 in actual use. From these data, it is expected that with addition of temperature control to the mold, and the careful tuning of the mold configured specifically for each type of part, that robust manufacturing processes will be readily obtained.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A unitary insert molded filtration device, comprising:
   at least one tubular wall, a fluid-permeable filter disposed across the tubular wall to define a filtration well, the filter having uncrushed flow segments bound by thin outer compressed segments formed proximate an edge of the filter that is embedded in the tubular wall, a plurality of support ribs unitarily formed with the tubular wall below the filter, and the filter having a plurality of inner compressed segments, each said inner compressed segment delimiting a side of a respective said rib.

2. The device of claim 1, wherein the filter is disposed proximate a bottom open end of the tubular wall.

3. The device of claim 1, further comprising a filter remnant embedded in the tubular wall of the well.

4. The device of claim 1, wherein the tubular wall is free of remnants resulting from a formation of the filter.

5. The device of claim 1, wherein the edge of the filter is frayed.

6. The device of claim 1, wherein the inner compressed segments are disposed radially around a central portion of the at least one tubular wall.

7. The device of claim 1, further comprising a packed bed of adsorbent particles disposed within the well.

8. The device of claim 7, wherein the adsorbent particles are selected from the group consisting of porous and nonporous adsorbent particles.

9. The device of claim 1, wherein the at least one tubular wall comprises a plurality of wells formed in a strip.

10. The device of claim 1, wherein the inner compressed segments are radial inner compressed segments.

11. The device of claim 1, wherein the at least one tubular wall comprises a plurality of wells formed in a two-dimensional array.

* * * * *